US012750521B2

(12) United States Patent
Reuze et al.

(10) Patent No.: US 12,750,521 B2
(45) Date of Patent: Sep. 29, 2026

(54) METHODS AND APPARATUSES FOR ENCODING AND DECODING AN IMAGE OR A VIDEO USING COMBINED INTRA MODES

(71) Applicant: InterDigital CE Patent Holdings, SAS, Paris (FR)

(72) Inventors: Kevin Reuze, Rennes (FR); Karam Naser, Mouaze (FR); Ya Chen, Rennes (FR); Thierry Dumas, Rennes (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 18/877,632

(22) PCT Filed: Jun. 22, 2023

(86) PCT No.: PCT/EP2023/066930
§ 371 (c)(1),
(2) Date: Dec. 20, 2024

(87) PCT Pub. No.: WO2024/002846
PCT Pub. Date: Jan. 4, 2024

(65) Prior Publication Data

US 2025/0392748 A1 Dec. 25, 2025

(30) Foreign Application Priority Data

Jun. 30, 2022 (EP) .................................... 22305953

(51) Int. Cl.
*H04N 19/593* (2014.01)
*H04N 19/11* (2014.01)
(Continued)

(52) U.S. Cl.
CPC ........... *H04N 19/593* (2014.11); *H04N 19/11* (2014.11); *H04N 19/132* (2014.11); *H04N 19/156* (2014.11); *H04N 19/176* (2014.11)

(58) Field of Classification Search
CPC .... H04N 19/11; H04N 19/132; H04N 19/156; H04N 19/176; H04N 19/593
(Continued)

(56) References Cited

U.S. PATENT DOCUMENTS 11,252,418 B2 * 2/2022 Rapaka .................. H04N 19/11
12,457,324 B2 * 10/2025 Filippov ................ H04N 19/11
(Continued)

FOREIGN PATENT DOCUMENTS

WO WO 2017205703 A1 11/2017

OTHER PUBLICATIONS

Abdoli et al., "Non-CE3: Decoder-side Intra Mode Derivation with Prediction Fusion Using Planar", Joint Video Experts Team (JVET) of ITU-T SG 16 WP 3 and ISO/IEC JTC 1/SC 29/WG 11, Document: JVET-00449-v2, 15th Meeting: Gothenburg, Sweden, Jul. 3, 2019, 9 pages.
(Continued)

*Primary Examiner* — Asmamaw G Tarko
(74) *Attorney, Agent, or Firm* — VOLPE KOENIG

(57) ABSTRACT

Methods and apparatuses for video coding are provided where a block is predicted using a combination of two intra prediction modes. A first prediction is generated from a non-directional mode, such as a Planar, Matrix-based Intra Prediction (MIP), or Intra Block Copy (IBC) mode. A second prediction is generated from a directional mode, which may be derived at a decoder from reconstructed neighboring samples without being explicitly signaled, reducing signaling overhead. A final prediction for the block is formed by combining the first and second predictions, for example, through a weighted average. This technique applies to both encoding and decoding processes.

17 Claims, 26 Drawing Sheets

(51) Int. Cl.
*H04N 19/132* (2014.01)
*H04N 19/156* (2014.01)
*H04N 19/176* (2014.01)

(58) Field of Classification Search
USPC .......................................................... 375/240.12
See application file for complete search history.

(56) References Cited

U.S. PATENT DOCUMENTS

| | | | | |
|---|---|---|---|---|
| 2017/0347103 | A1* | 11/2017 | Yu | H04N 19/159 |
| 2021/0092405 | A1* | 3/2021 | Biatek | H04N 19/70 |
| 2021/0344929 | A1* | 11/2021 | Choi | H04N 19/11 |
| 2022/0232206 | A1* | 7/2022 | Lee | H04N 19/593 |
| 2023/0283780 | A1* | 9/2023 | Bae | H04N 19/159 375/240.02 |
| 2023/0336748 | A1* | 10/2023 | Ye | H04N 19/132 |
| 2023/0345015 | A1* | 10/2023 | Ye | H04N 19/593 |
| 2023/0370601 | A1* | 11/2023 | Ye | H04N 19/176 |
| 2025/0055997 | A1* | 2/2025 | Chen | H04N 19/186 |

OTHER PUBLICATIONS

Seregin et al., "EE2: Summary Report on Enhanced Compression beyond VVC capability", Joint Video Experts Team (JVET) of ITU-T SG. 16 WP3 and ISO/IEC JTC1/SC29, Document: JVET-Z0024-v3, 26th Meeting, by teleconference, Apr. 20, 2022, 21 pages.
"Infrastructure of audiovisual services—Coding of moving video", International Telecommunication Union, Telecommunication Standardization Sector of ITU, Series H: Audiovisual and Multimedia Systems, Recommendation ITU-T H.266, Apr. 2022, 536 pages.
"Infrastructure of audiovisual services—Coding of moving video—High Efficiency Video Coding", International Telecommunications Union (ITU), ITU-T Telecommunication Standardization Sector of ITU, Series H: Audiovisual and Multimedia Systems, Recommendation ITU-T H.265, Oct. 2014, 540 pages.
Cao et al., "EE2-related: Fusion for template-based intra mode derivation", Joint Video Experts Team (JVET) of ITU-T SG 16 WP 3 and ISO/IEC JTC 1/SC 29, Document: JVET-W0123-v2, 23rd Meeting by teleconference, Jul. 7, 2021, 4 pages.
Coban et al., "Algorithm description of Enhanced Compression Model 4 (ECM 4)" Joint Video Expert Team (JVET) of ITU-T SG 16 WP3 and ISO/IEC JTC1/SC29, Document: JVET-Y2025-v2, 23rd Meeting, by teleconference, Jul. 7, 2021, 32 pages.
Browne et al., "Algorithm description for Versatile Video Coding and Test Model 16 (VTM16)", Joint Video Experts Team (JVET) of ITU-T SG 16 WP 3 and ISO/IEC JTC 1/SC 29, Document: JVET-Y2002-v1, 25th Meeting, by teleconference, Jan. 12, 2022, 126 pages.
Coban et al., "Algorithm description of Enhanced Compression Model 3 (ECM 3)", Joint Video Experts Team (JVET) of ITU-T SG 16 WP 3 and ISO/IEC JTC 1/SC 29, Document: JVET-X2025-v2, 23rd Meeting, by teleconference, Jul. 7, 2021, 28 pages.
Seregin et al., "Block shape dependent intra mode coding", Joint VIdeo Experts Team (JVET) of ITU-T SG 16 WP3 and ISO/IEC JTC1/SC29/WG11, Document: JVET-D0114-r1, 4th Meeting, Chengdu, China, Oct. 15, 2016, 3 pages.
Alshin et al., "Description of SDR, HDR and 360° video coding technology proposal considering mobile application scenario by Samsung, Huawei, GoPro, and HiSilicon", Joint Video Exploration Team (JVET) of ITU-T SG. 16 WP3 and ISO/IEC JTC1/SC29/WG11, Document: JVET-J0024-v2, 10th Meeting, San Diego, United States, Apr. 10, 2018, 124 pages.
Kidani et al., "EE2-3.1: GPM with inter and intra prediction (JVET-X0166)", Joint Video Experts Team (JVET) of ITU-T SG 16 WP 3 and ISO/IEC JTC 1/SC 29, Document: JVET-Y0065, 25th Meeting, by teleconference, Jan. 12, 2022, 5 pages.
Xu, Jizheng., "EE2-3.2-related: IBC Adaptation for Camera-Captured Contents", Joint Video Experts Team (JVET) of ITU-T SG 16 WP 3 and ISO/IEC JTC 1/SC 29, Document: JVET-Z0157-v4, 26th Meeting, by teleconference, Apr. 20, 2022, 5 pages.
"Transmission of Non-Telephone Signals: Information Technology—Generic Coding of Moving Pictures and Associated Audio Information: Systems", International Telecommunication Union, Telecommunication Standardization Sector of ITU, Recommendation ITU-T H.222.0, Jul. 1995, 135 pages.
"Infrastructure of audiovisual services—Coding of moving video—Information Technology—Generic coding of moving pictures and associated audio information: Video", International Telecommunication Union, Telecommunication Standardization Sector of ITU, Series H: Audiovisual and Multimedia Systems, Recommendation ITU-T H.262, Feb. 2000, 220 pages.

* cited by examiner

Flag in Black: CABAC Context Model(s)
Flag in Gray (MIP Transpose Flag Only): Bypass Flag Not in Italic: CABAC Context Model(s)
Flag in Italic: Bypass (a)

(b)

(c)

Flag in Black: CABAC Context Model(s)
Flag in Gray (MIP Transpose Flag Only): Bypass Flag in Black: CABAC Context Model(s)
Flag in Gray (MIP Transpose Flag Only): Bypass

METHODS AND APPARATUSES FOR ENCODING AND DECODING AN IMAGE OR A VIDEO USING COMBINED INTRA MODES

This application is a U.S. National Stage Application under 35 U.S.C. § 371 of International Patent Application No. PCT/EP2023/066930. filed Jun. 22, 2023, which claims the benefit of and/or priority to European Application No. 22305953.6, filed Jun. 30, 2022, which is incorporated herein by reference in its entirety.

TECHNICAL FIELD

The present embodiments generally relate to video compression. The present embodiments relate to a method and an apparatus for encoding and decoding a block of an image or a video based on a combination of intra prediction modes.

BACKGROUND

To achieve high compression efficiency, image and video coding schemes usually employ prediction and transform to leverage spatial and temporal redundancy in the video content. Generally, intra or inter prediction is used to exploit the intra or inter picture correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

According to an aspect, a method for encoding at least one block of an image or a video is provided wherein the method comprises, for the at least one block, obtaining a first intra prediction mode, obtaining a second intra prediction mode, encoding the at least one block based on a combination of the first intra prediction mode and the second intra prediction mode.

According to an aspect, a method for decoding at least one block of an image or a video is provided wherein the method comprises, for the at least one block, obtaining a first intra prediction mode, obtaining a second intra prediction mode, decoding the at least one block based on a combination of the first intra prediction mode and the second intra prediction mode.

According to another aspect, an apparatus for encoding at least one block of an image or a video is provided, wherein the apparatus comprises one or more processors, the one or more processors is operable to, for the at least one block of an image or a video, obtain a first intra prediction mode, obtain a second intra prediction mode, encode the at least one block based on a combination of the first intra prediction mode and the second intra prediction mode.

According to another aspect, an apparatus for decoding at least one block of an image or a video is provided, wherein the apparatus comprises one or more processors, the one or more processors is operable to, for the at least one block of an image or a video, obtain a first intra prediction mode, obtain a second intra prediction mode, decode the at least one block based on a combination of the first intra prediction mode and the second intra prediction mode.

According to another aspect, a method for encoding at least one block of an image or a video is provided wherein the method comprises, for the at least one block, obtaining a first intra prediction mode, responsive to a determination that the first intra prediction mode is to be combined with a second intra prediction mode, obtaining the second intra prediction mode, encoding the at least one block based on a combination of the first intra prediction mode and the second intra prediction mode.

According to another aspect, a method for decoding at least one block of an image or a video is provided wherein the method comprises, for the at least one block, obtaining a first intra prediction mode, responsive to a determination that the first intra prediction mode is to be combined with a second intra prediction mode, obtaining the second intra prediction mode, decoding the at least one block based on a combination of the first intra prediction mode and the second intra prediction mode.

According to another aspect, an apparatus for encoding at least one block of an image or a video is provided, wherein the apparatus comprises one or more processors, the one or more processors is operable to, for the at least one block of an image or a video, obtain a first intra prediction mode, responsive to a determination that the first intra prediction mode is to be combined with a second intra prediction mode, obtain the second intra prediction mode, encode the at least one block based on a combination of the first intra prediction mode and the second intra prediction mode.

According to another aspect, an apparatus for decoding at least one block of an image or a video is provided, wherein the apparatus comprises one or more processors, the one or more processors is operable to, for the at least one block of an image or a video, obtain a first intra prediction mode, responsive to a determination that the first intra prediction mode is to be combined with a second intra prediction mode, obtain the second intra prediction mode, decode the at least one block based on a combination of the first intra prediction mode and the second intra prediction mode.

In some embodiments, the first intra prediction mode is obtained from among a first set of intra prediction modes and the second intra prediction mode is obtained from among a second set of intra prediction modes, the first and second sets of intra prediction modes being distinct.

In some embodiments, a first set of intra prediction modes includes non-directional intra prediction modes, and a second set of intra prediction modes includes directional intra prediction modes.

One of the first intra prediction mode and the second intra prediction mode is obtained from the first set of intra prediction modes, and the other of the first intra prediction mode and the second intra prediction mode is obtained from the second set of intra prediction modes.

In some embodiments, the first intra prediction mode is one of a Planar prediction mode, DC prediction mode, Intra block copy prediction mode, Matrix-based Intra prediction mode. In some embodiments, the second intra prediction mode is one of a directional intra prediction mode.

In some embodiments, the second intra prediction mode is derived from reconstructed samples neighboring the at least one block. In a variant, the second intra prediction mode is obtained from at least one of a decoder side intra mode derivation or a template based intra mode derivation.

In some embodiments, the combination is a weighted average of a prediction obtained from the first intra prediction mode and a prediction obtained from the second intra prediction mode. In some variants, the weights used in the combination depend on at least one of the first intra prediction mode, or an indicator signaled in a bitstream indicating a weight from among a set of weights to use for the prediction from the first intra prediction mode, or a cost obtained when determining the second intra prediction mode, or a rank of the second prediction mode in a list of intra prediction modes. In another variant, the weights used in the combination are derived from a cost obtained when determining the second intra prediction mode. In another variant, the weights vary with a location of the samples in the at least one block.

In an embodiment, the one or more processors are operable to encode an image or a video to which the block belongs. In an embodiment, the one or more processors are operable to decode an image or a video to which the block belongs. Further embodiments that can be used alone or in combination are described herein.

One or more embodiments also provide a computer program comprising instructions which when executed by one or more processors cause the one or more processors to perform the method for encoding/decoding a block of an image or a video according to any of the embodiments described herein. One or more of the present embodiments also provide a non-transitory computer readable medium and/or a computer readable storage medium having stored thereon instructions for encoding/decoding a block of an image or a video according to the methods described herein.

One or more embodiments also provide a computer readable storage medium having stored thereon a bitstream generated according to the methods described herein. One or more embodiments also provide a method and apparatus for transmitting or receiving the bitstream generated according to the methods described above.

DETAILED DESCRIPTION

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 1:
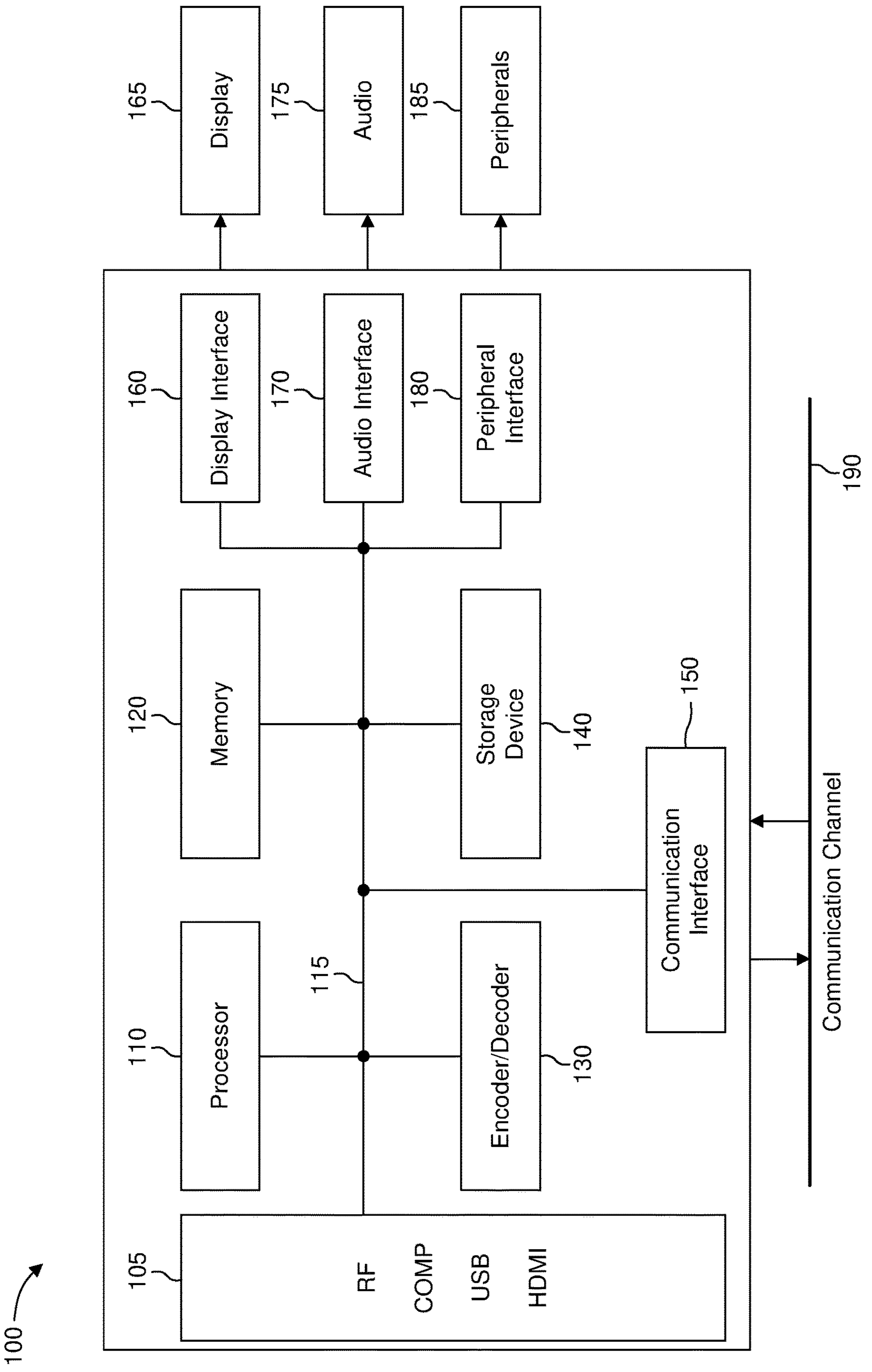
FIG. 1 illustrates a block diagram of a system within which aspects of the present embodiments may be implemented.
Figure 2:
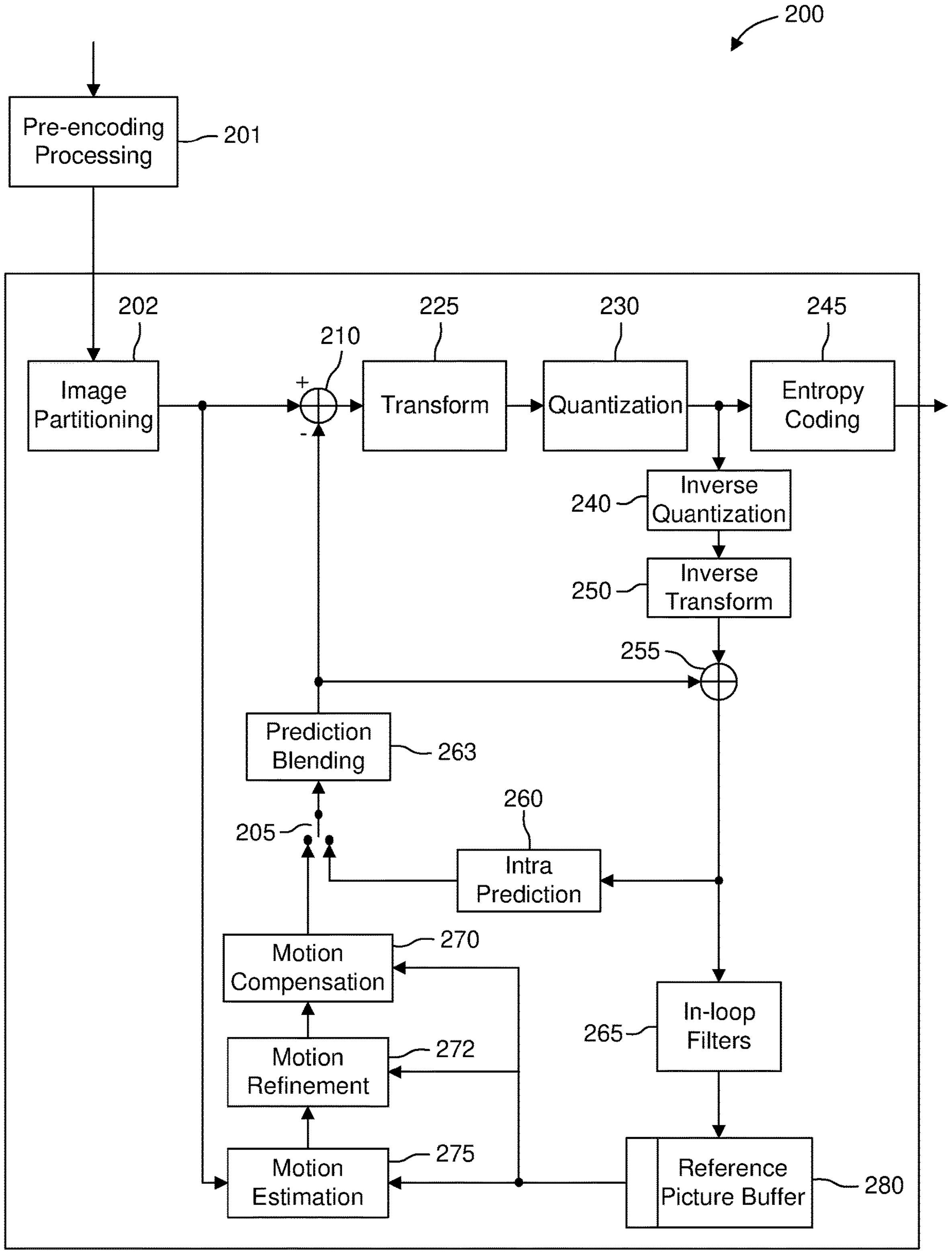
FIG. 2 illustrates a block diagram of an embodiment of a video encoder within which aspects of the present embodiments may be implemented.
Figure 3:
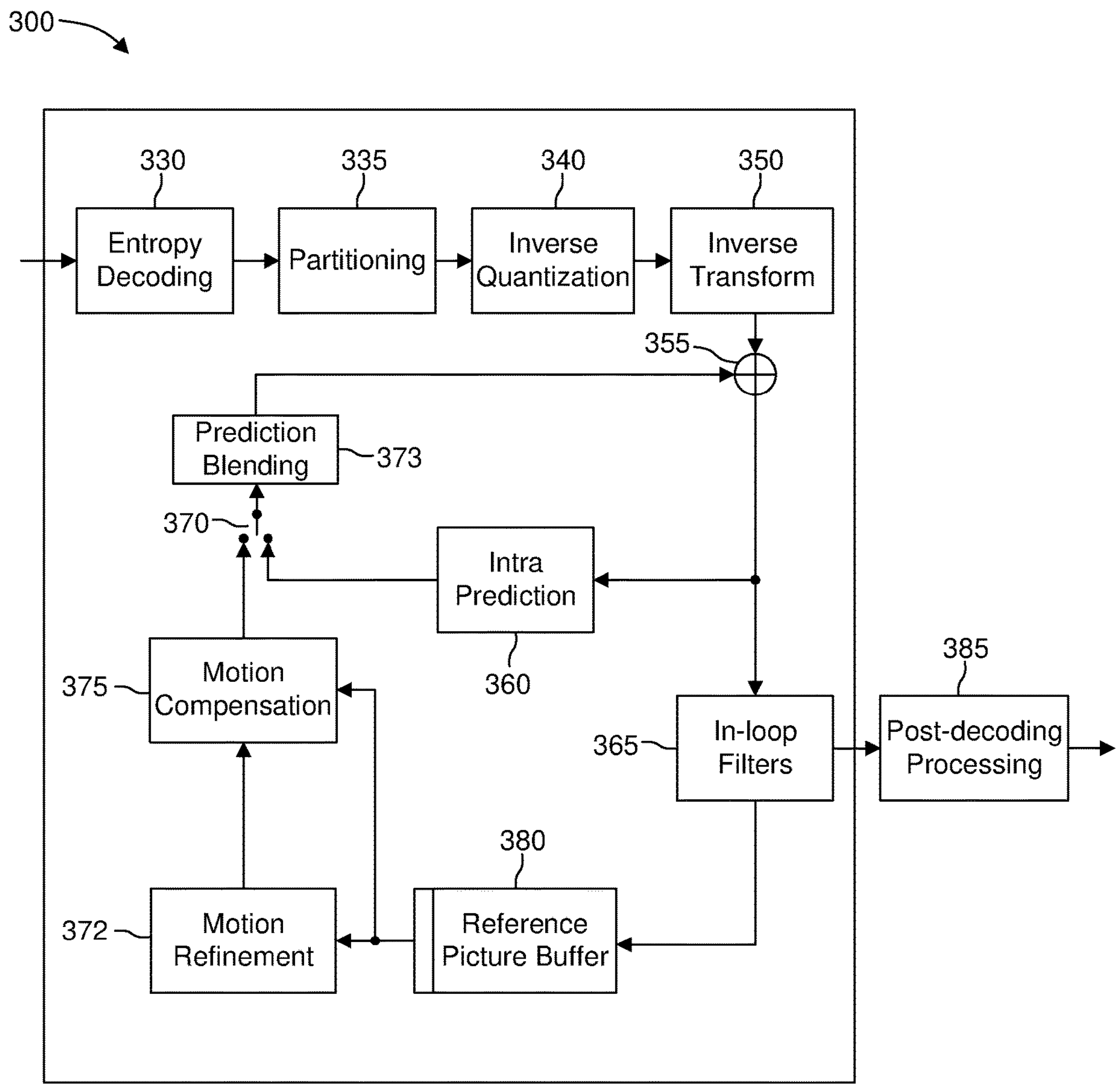
FIG. 3 illustrates a block diagram of an embodiment of a video decoder within which aspects of the present embodiments may be implemented.

The aspects described and contemplated in this application can be implemented in many different forms. FIGS. 1, 2 and 3 below provide some embodiments, but other embodiments are contemplated and the discussion of FIGS. 1, 2 and 3 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

The present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

FIG. 1 illustrates a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In some embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 100 may be provided through various input devices as indicated in block 105. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 1, include composite video.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which can be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the data stream as necessary for presentation on an output device.

Various elements of system 100 may be provided within an integrated housing, Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11 (IEEE refers to the Institute of Electrical and Electronics Engineers). The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105. As indicated above, various embodiments provide data in a non-streaming manner. Additionally, various embodiments use wireless networks other than Wi-Fi, for example a cellular network or a Bluetooth network.

The system 100 may provide an output signal to various output devices, including a display 165, speakers 175, and other peripheral devices 185. The display 165 of various embodiments includes one or more of, for example, a touchscreen display, an organic light-emitting diode (OLED) display, a curved display, and/or a foldable display. The display 165 can be for a television, a tablet, a laptop, a cell phone (mobile phone), or other device. The display 165 can also be integrated with other components (for example, as in a smart phone), or separate (for example, an external monitor for a laptop). The other peripheral devices 185 include, in various examples of embodiments, one or more of a stand-alone digital video disc (or digital versatile disc) (DVR, for both terms), a disk player, a stereo system, and/or a lighting system. Various embodiments use one or more peripheral devices 185 that provide a function based on the output of the system 100. For example, a disk player performs the function of playing the output of the system 100.

In various embodiments, control signals are communicated between the system 100 and the display 165, speakers 175, or other peripheral devices 185 using signaling such as AV.Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

The embodiments can be carried out by computer software implemented by the processor 110 or by hardware, or by a combination of hardware and software. As a non-limiting example, the embodiments can be implemented by one or more integrated circuits. The memory 120 can be of any type appropriate to the technical environment and can be implemented using any appropriate data storage technology, such as optical memory devices, magnetic memory devices, semiconductor-based memory devices, fixed memory, and removable memory, as non-limiting examples. The processor 110 can be of any type appropriate to the technical environment, and can encompass one or more of microprocessors, general purpose computers, special purpose computers, and processors based on a multi-core architecture, as non-limiting examples.

FIG. 2 illustrates an encoder 200. Variations of this encoder 200 are contemplated, but the encoder 200 is described below for purposes of clarity without describing all expected variations. In some embodiments, FIG. 2 also illustrate an encoder in which improvements are made to the HEVC standard or a VVC standard or an encoder employing technologies similar to HEVC or VVC, such as an encoder ECM under development by JVET (Joint Video Exploration Team). Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of color components), or re-sizing the picture (ex: down-scaling). Metadata can be associated with the pre-processing, and attached to the bitstream.

In the encoder 200, a picture is encoded by the encoder elements as described below. The picture to be encoded is partitioned (202) and processed in units of, for example, CUs (Coding units) or blocks. In the disclosure, different expressions may be used to refer to such a unit or block resulting from a partitioning of the picture. Such wording may be coding unit or CU, coding block or CB, luminance CB, or block . . . A CTU (Coding Tree Unit) may refer to a group of blocks or group of units. In some embodiments, a CTU may be considered as a block, or a unit as itself.

Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. The encoder may also blend (263) intra prediction result and inter prediction result, or blend results from different intra/inter prediction methods. Prediction residuals are calculated, for example, by subtracting (210) the predicted block from the original image block.

The motion refinement module (272) uses already available reference picture in order to refine the motion field of a block without reference to the original block. A motion field for a region can be considered as a collection of motion vectors for all pixels with the region. If the motion vectors are sub-block-based, the motion field can also be represented as the collection of all sub-block motion vectors in the region (all pixels within a sub-block has the same motion vector, and the motion vectors may vary from sub-block to sub-block). If a single motion vector is used for the region, the motion field for the region can also be represented by the single motion vector (same motion vectors for all pixels in the region).

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

FIG. 3 illustrates a block diagram of a video decoder 300. In the decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which can be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed.

The predicted block can be obtained (370) from intra prediction (360) or motion-compensated prediction (i.e., inter prediction) (375). The decoder may blend (373) the intra prediction result and inter prediction result, or blend results from multiple intra/inter prediction methods. Before motion compensation, the motion field may be refined (372) by using already available reference pictures. In-loop filters (365) are applied to the reconstructed image. The filtered image is stored at a reference picture buffer (380).

The decoded picture can further go through post-decoding processing (385), for example, an inverse color transform (e.g. conversion from YCbCr 4:2:0 to RGB 4:4:4) or an inverse remapping performing the inverse of the remapping process performed in the pre-encoding processing (201), or re-sizing the reconstructed pictures (ex: up-scaling). The post-decoding processing can use metadata derived in the pre-encoding processing and signaled in the bitstream.

Some of the embodiments described herein relates to intra prediction used in image or video coding. As an example, for a given block to be predicted, the encoder selects a best intra prediction mode in terms of rate-distortion and signals the selected intra prediction mode index to the decoder. This way, for this block, the decoder can perform the same prediction. Signaling the index of the selected intra prediction mode can add extra overhead, reducing the coding gain from the intra part of a coded video. An example of coding the index of the intra prediction mode selected to predict a given block is to create a list of Most Probable Modes (MPMs), and thus reduce the signaling overhead if the index of the selected intra prediction mode belongs to that list. This is a classical method for signaling the intra prediction mode index, known as MPM list-based signaling. This method is employed for instance in VVC and HEVC. This method is extended in ECM (Enhanced Compression Model) where two MPM lists are used instead of one.

In the following, for conciseness, MPM list-based signaling used for signaling of a mode index is shortened to the signaling of a mode.

To further limit the signaling overhead, ECM also features two tools deriving from decoded pixels surrounding a given block the intra prediction modes that are the most likely a best intra prediction mode for predicting the given block in terms of rate-distortion. For each of these two tools, the drop in signaling overhead arises from the fact that the signaling of the tool alone enables the decoder to get the indices of the most likely "best" intra prediction modes.

The first tool is known as Decoder-side Intra Mode Derivation (DIMD). The second tool is called Template-based Intra Mode Derivation (TIMD). More specifically, in DIMD, a template of decoded pixels above and on the left side of a current block to predict is analyzed to deduce the directionalities of the template, from which two directional intra prediction modes are selected. The prediction signal is generated by blending those two intra prediction modes with the planar mode. In TIMD, several intra prediction modes are tested on a template of decoded pixels above and on the left side of the current block. A cost (Sum of Absolute Transform Differences (SATDs)) is determined for each one of the intra prediction modes tested between decoded samples of the template and predicted samples of the template using the tested intra prediction mode. The two intra prediction modes yielding the two smallest costs are kept. The prediction signal is generated by either applying the intra prediction mode with smallest SATD or blending the two intra prediction modes providing the two smallest costs.

In VVC and ECM, there exist other intra prediction tools, such as Intra Block Copy (IBC) and Matrix-based Intra Prediction (MIP). In IBC, a reference block from a reconstructed part of a current frame is copied and used as the prediction of the current block. In MIP, a matric vector multiplication is performed between the reference samples and a matrix, selected from a set of available matrices, to compute the prediction of the current block.

In HEVC and VVC, there are also inter prediction tools which predict the current block from reconstructed frames. Some of these tools use bi-prediction and predict the current block by doing a weighted average from two inter predictions. Some tools, such as Combined Intra Inter Prediction (CIIP) also perform a weighted average between an intra prediction and an inter prediction.

Somes embodiments of the present disclosure relates to a method for encoding or decoding a block of an image or a video wherein a weighted average between two intra prediction modes is used for predicting the block, allowing to increase the performance of the intra compression in ECM and VVC.

Examples of intra prediction modes are described below in relation with FIG. 4-18.

In the present document, the terms "intra mode" or "intra prediction mode" may refer to any one of the intra prediction tools described herein such as the MIP, IBC, CIIP, or any one of the core 67 intra prediction modes as known from HEVC, VVC or ECM, or any other mode that generate a prediction for a unit from reconstructed samples of a picture to which the unit belong.

Figure 4:
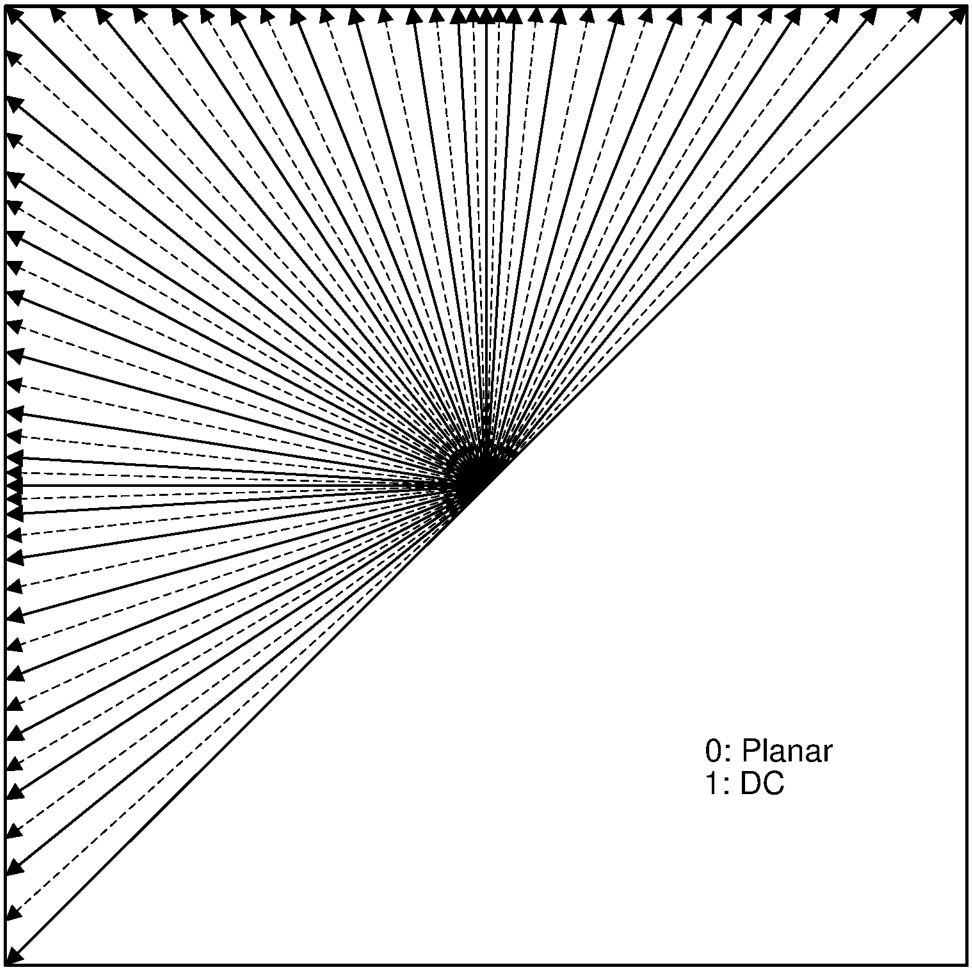
FIG. 4 illustrates an example of the 67 intra prediction modes in the VVC standard and ECM under development.

Core 67 Intra Prediction Modes:

To capture the arbitrary edge directions presented in natural video, the number of directional intra prediction modes in VVC is extended from 33, as used in HEVC, to 65. FIG. 4 illustrates the directional intra prediction modes in VVC, the directional modes from HEVC are shown in plain black arrows, while the new directional modes of VVC that are not in HEVC are depicted as black dotted arrows. These denser directional intra prediction modes apply for all block sizes and for both luma and chroma intra predictions. In VVC, addition to the 65 directional intra prediction modes, a Planer mode and a DC mode are provided, bringing the number of core intra prediction modes to 67.

From HEVC to VVC, the planar mode and the DC mode remain unchanged, excluding the following minor modification. In HEVC, every intra-coded block has a square shape and the length of each of its side is a power of 2. Thus, no division operations are required to generate an intra-predictor using DC. In VVC, blocks can have a rectangular shape that necessitates the use of a division operation per block in the general case. To avoid division operations for DC prediction, only the longer side is used to compute the average for non-square blocks.

In ECM, the core structure of the 67 intra prediction modes is inherited from that in VVC. This core structure is refined in ECM wherein the four-tap interpolation for a directional intra prediction mode from VVC becomes a six-tap interpolation in ECM. Position Dependent Intra Prediction Combination (PDPC) is supplemented in ECM with a gradient PDPC.

Intra Prediction Mode Signaling in ECM

Intra Prediction Mode Signaling in Luminance

In ECM (currently ECM-4.0), if the intra prediction mode selected to predict a current luminance Coding Block (CB) is neither DIMD nor a Matrix-based Intra Prediction (MIP) mode nor TIMD, i.e. it is one of the 67 intra prediction modes mentioned above, its index is signaled using the MPM list of this CB.

Figure 5A:
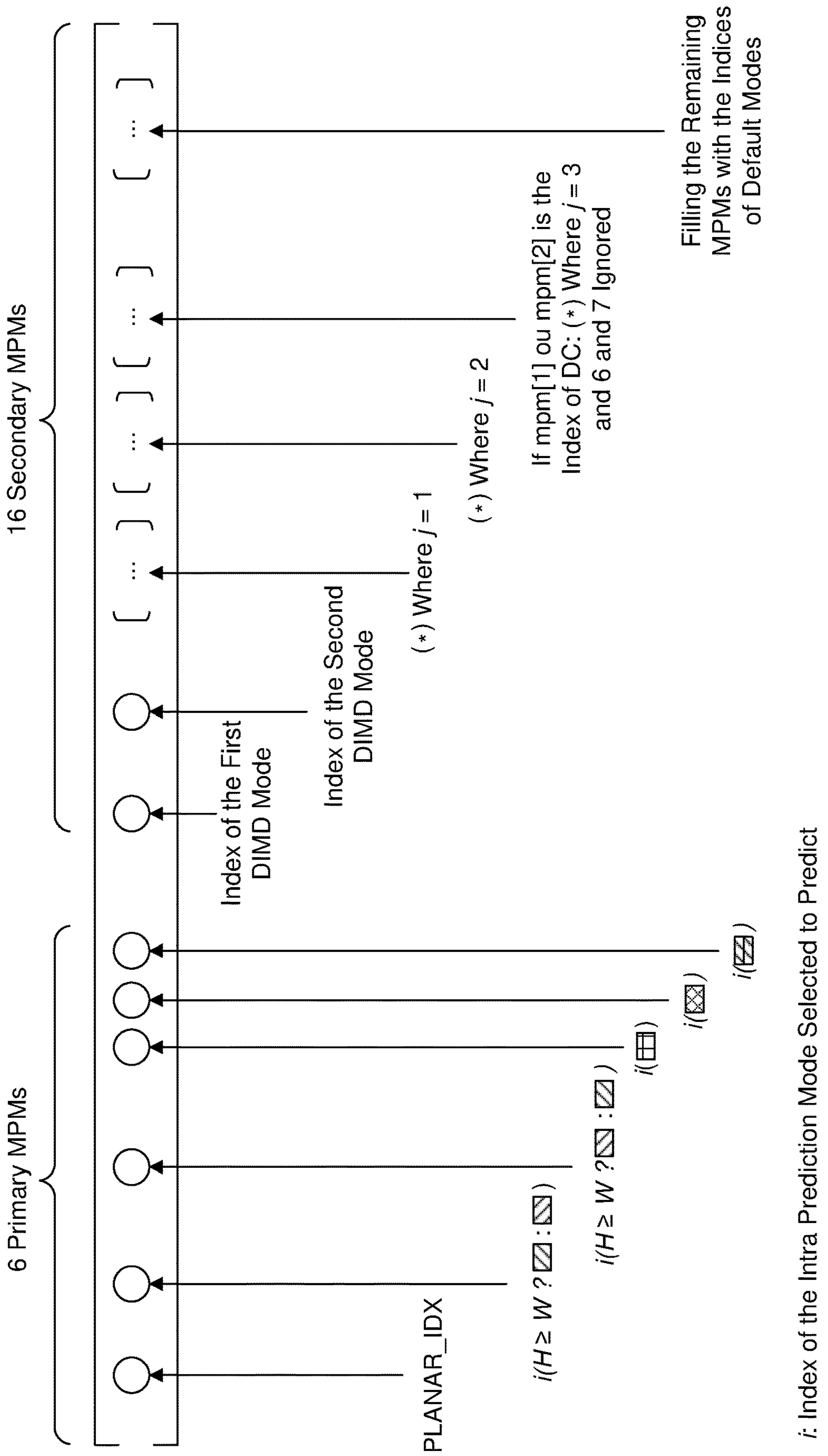
FIGS. 5A and 5B illustrate an example of the derivation of a generic MPM list for a luminance CB belonging to an intra slice in ECM.
Figure 5B:
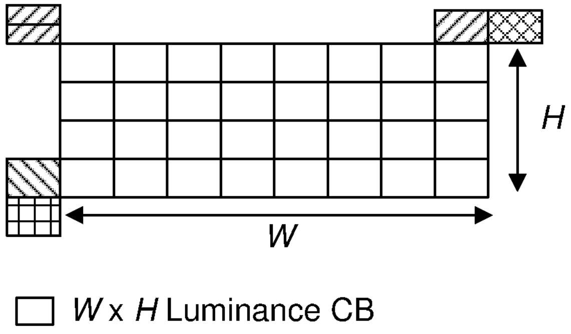
Figure 5B:
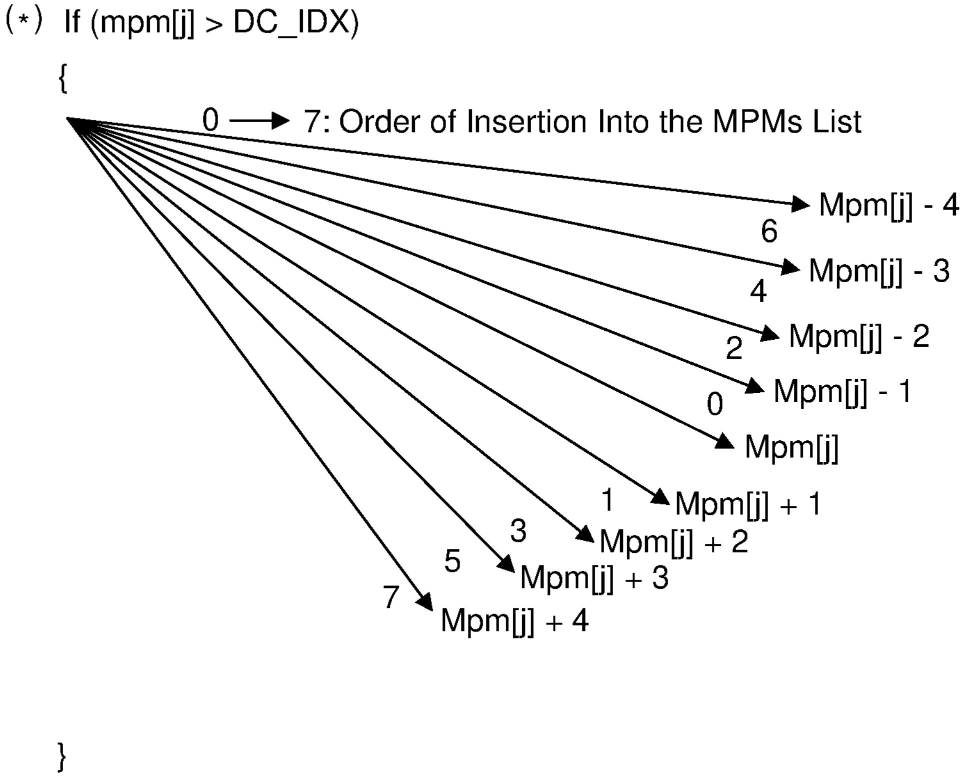

In ECM (currently ECM-4.0), the generic MPM list is decomposed into a list of 6 primary MPMs and a list of 16 secondary MPMs, as illustrated in FIGS. 5A and 5B. The generic MPM list is built by sequentially adding candidate intra prediction mode indices, from the one most likely being the selected intra prediction mode for predicting the current luminance CB to the least likely one. FIG. 5A shows, from left to right, the sequential addition of the candidate intra prediction mode indices in the case where the current luminance CB to predict belongs to an intra slice, the current luminance CB having a width W and a height H. Candidate intra prediction modes are inserted in the primary or secondary lists in a specific order, some intra prediction modes being inserted in one of the lists depending on conditions illustrating in 5A and 5B. For the primary list, the first MPM is the planar intra prediction mode, then the subsequent intra prediction modes that are inserted are the intra prediction modes used for predicting neighboring CB of the current luminance CB. For the secondary list, the two intra prediction modes obtained from the DIMD are inserted, then other intra prediction modes are inserted into the secondary list by considering neighboring intra prediction modes of one or more intra prediction modes inserted in the primary list until the size limit of the secondary list is reached. Some defaults modes may be added when the size limit is not reached.

It is to be noted that no redundancy exists in the generic list of MPMs, meaning that it cannot contain two identical intra prediction mode indices. For readability, FIGS. 5A and 5B illustrate the case where each candidate intra prediction mode index is different from one another. But, in the generic case, the slots of indices 0 to i−1 included in the generic list of MPMs have already been filled. If the current candidate intra prediction mode index already exists in the current generic list of MPMs, this candidate is skipped, and the next candidate intra prediction mode is inserted at the slot of index i if it does not exist in the generic list of MPMs. Otherwise, the current intra prediction mode index is inserted at the slot of index i and the next candidate intra prediction mode is inserted at the slot of index i+1 if it does not exist in the generic list of MPMs.

Figure 6A:
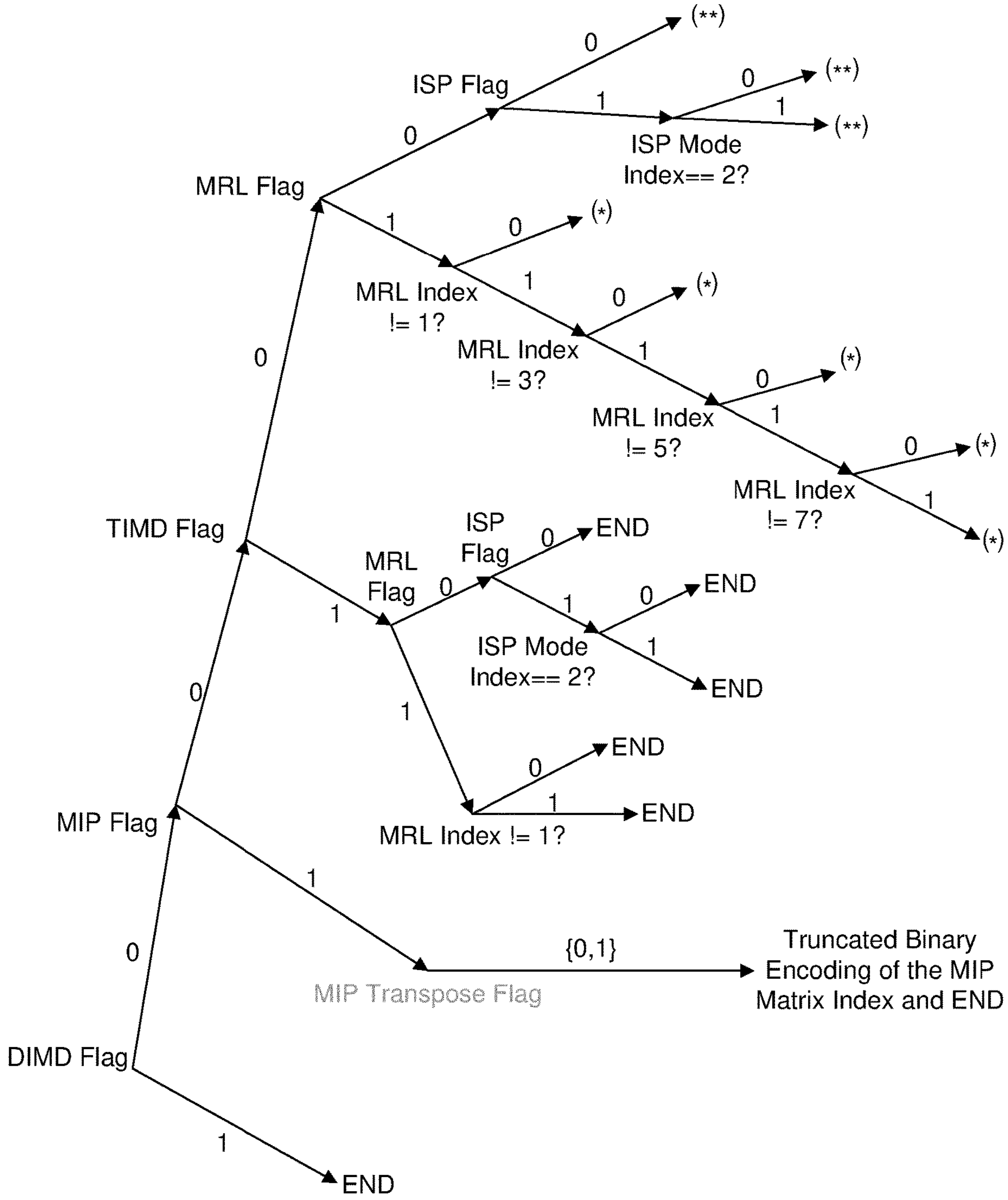
FIGS. 6A and 6B illustrate an example of signaling of the intra prediction mode used to predict a luminance CB in ECM.
Figure 6B:
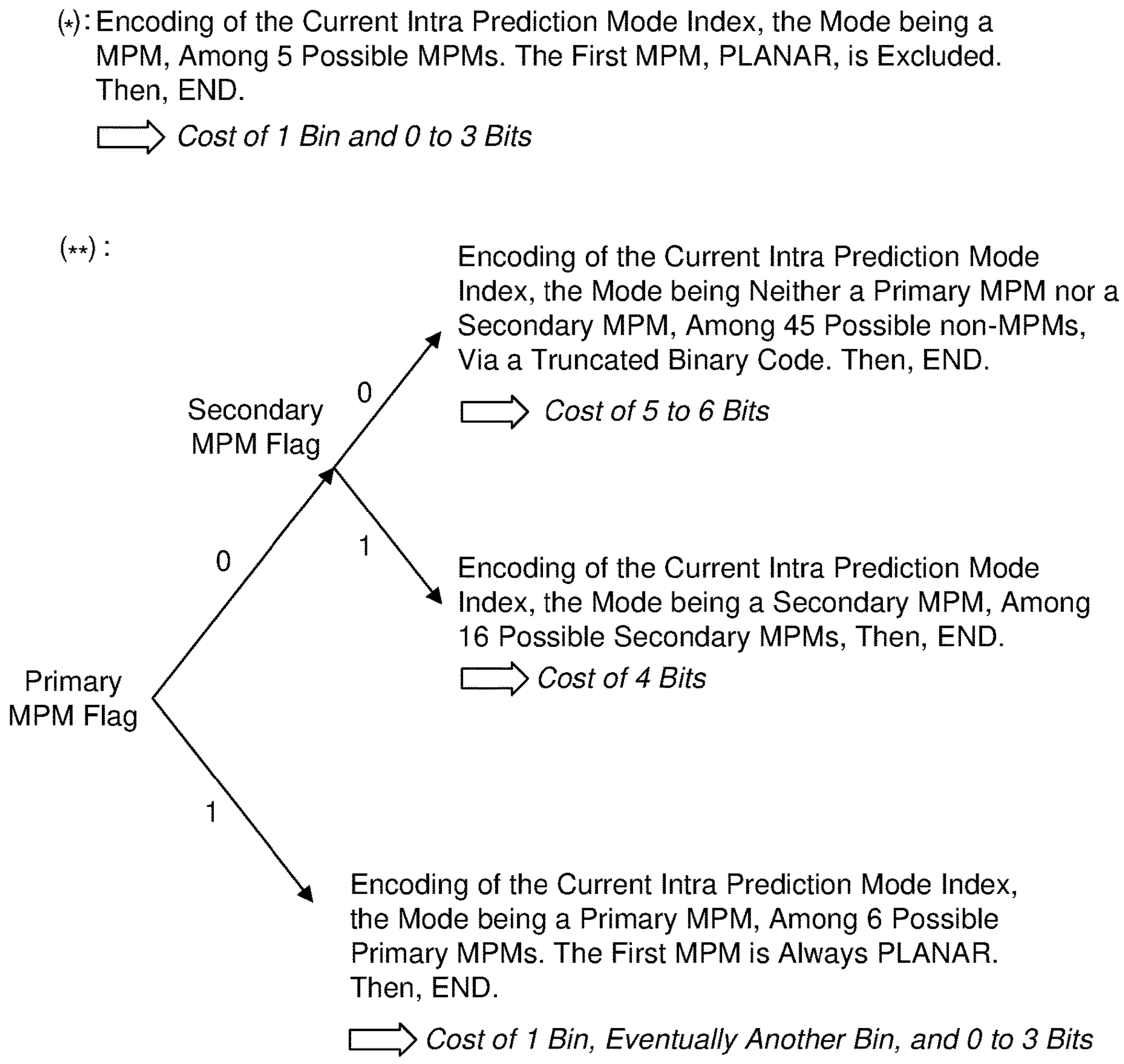

The signaling of the intra prediction mode selected to predict the current luminance CB in ECM (currently ECM-4.0) is depicted in FIGS. 6A and 6B. Note that FIGS. 6A and 6B describe the signaling of the intra prediction mode selected to predict the current luminance CB on the encoder side. But the same applies on the decoder side. In FIGS. 6A and 6B, MRL denotes Multiple Reference Lines. If the TIMD flag equals 1, the MRL index belongs to {0, 1, 3}. MRL index at 0 means that MRL is not used for predicting the current luminance CB. MRL index at 1 means that the second row of decoded reference samples above the current luminance CB and the second column of decoded reference samples on the left side of the current luminance CB are used for prediction. MRL index at 3 means that the fourth row of decoded reference samples above the current luminance CB and the fourth column of decoded reference samples on the left side of the current luminance CB are used for prediction. If the TIMD flag equals 0, the MRL index belongs to {0, 1, 3, 5, 7, 12}. ISP denotes Intra Sub-Partition. The ISP mode index belongs to {0, 1, 2}. ISP mode index at 0 means that ISP is not used for the current luminance CB. ISP mode index at 1 indicates that the current luminance CB is split horizontally into luminance Transform Blocks (TBs). ISP mode index at 2 indicates that the current luminance CB is split vertically into luminance TBs. In this figure, the intra prediction mode BDPCM (Intra Block-DPCM), TMP (Template Matching based intra prediction), IBC (Intra Block Coding), and Palette are omitted as these tools are turned on for specific video sequences exclusively.

Intra Prediction Mode Signaling in Chrominance

Figure 7:
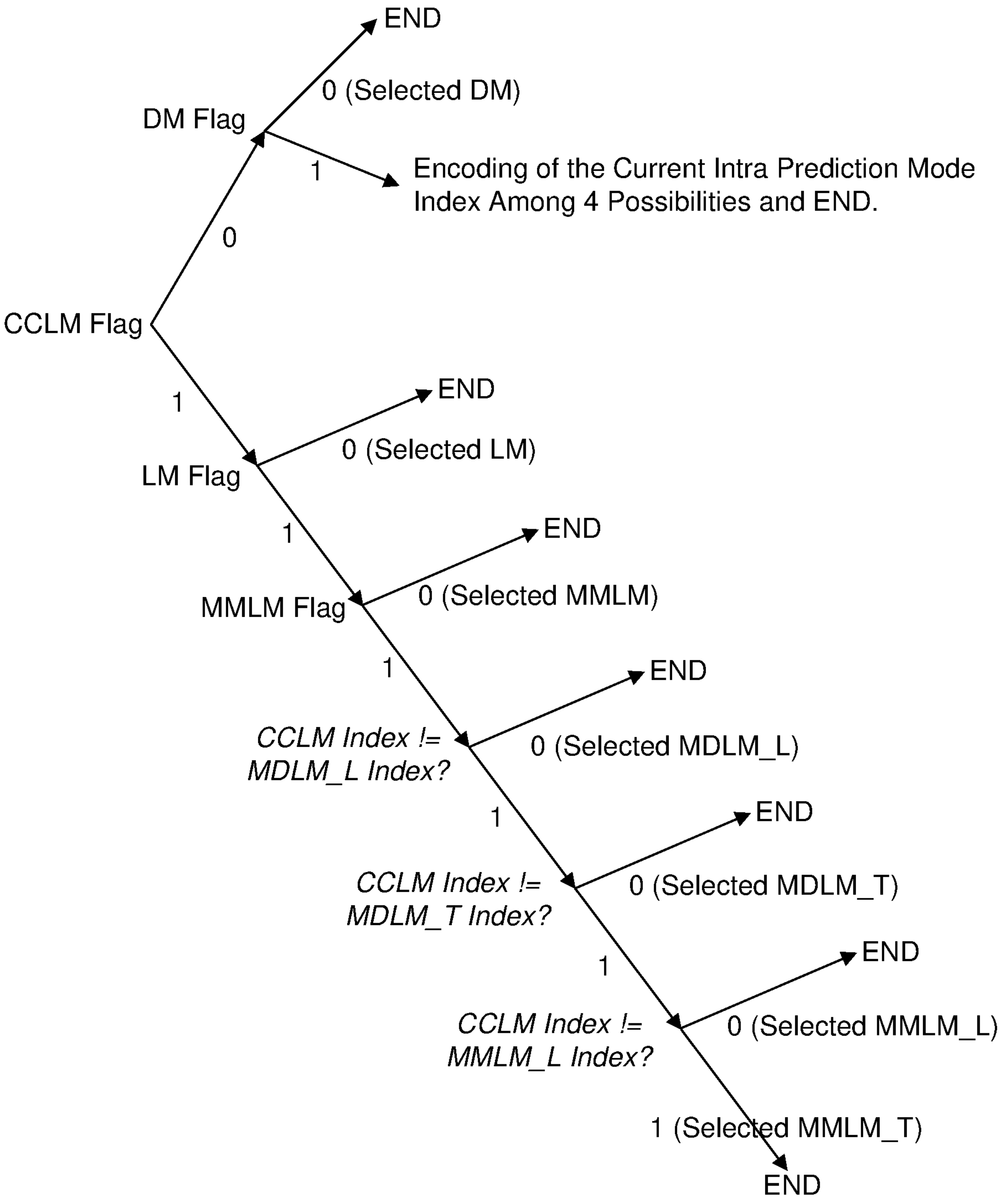
FIG. 7 illustrates an example of signaling the intra prediction mode used to predict a pair of chrominance CBs in ECM.

The signaling of the intra prediction mode selected to predict the current pair of chrominance CBs, that is collocated Cb and Cr CBs of the current luminance CB, in ECM (currently ECM-4.0) is shown in FIG. 7. In FIG. 7, if the Direct Mode (DM) flag equals 1, the four possibilities for the current intra prediction mode index are the index of the planar mode, that of the horizontal mode, that of the vertical mode, and that of DC. To avoid any redundancy, if the DM is one of the four above-mentioned modes, in this set of four modes, the index of the redundant mode is replaced by the index of the vertical diagonal mode. Note that, in ECM (currently ECM-4.0), Cross-Component Linear Model (CCLM) gathers six different intra prediction modes, denoted LM, MMLM, MDLM_L, MDLM_T, MMLM_L, and MMLM_T, whereas, in VVC, CCLM gathers only three intra prediction modes.

Wide Angle Intra Prediction (WAIP)

In VVC and ECM, for non-square blocks, several conventional angular intra prediction modes are replaced with wide angular modes. The replaced modes are signaled using the original method and remapped to the indexes of wide angular modes after parsing. The total number of core intra prediction modes is unchanged, i.e., 67.

Figure 8:
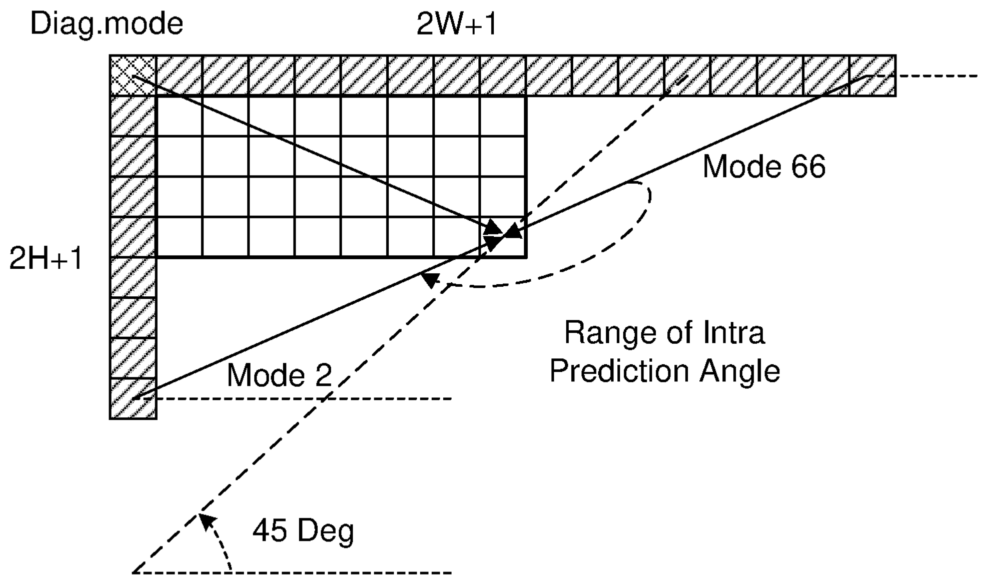
FIG. 8 illustrates an example of relationship between an extent of the set of decoded reference samples surrounding a W×H block to be predicted and the range of allowed intra prediction angles.
Figure 8:
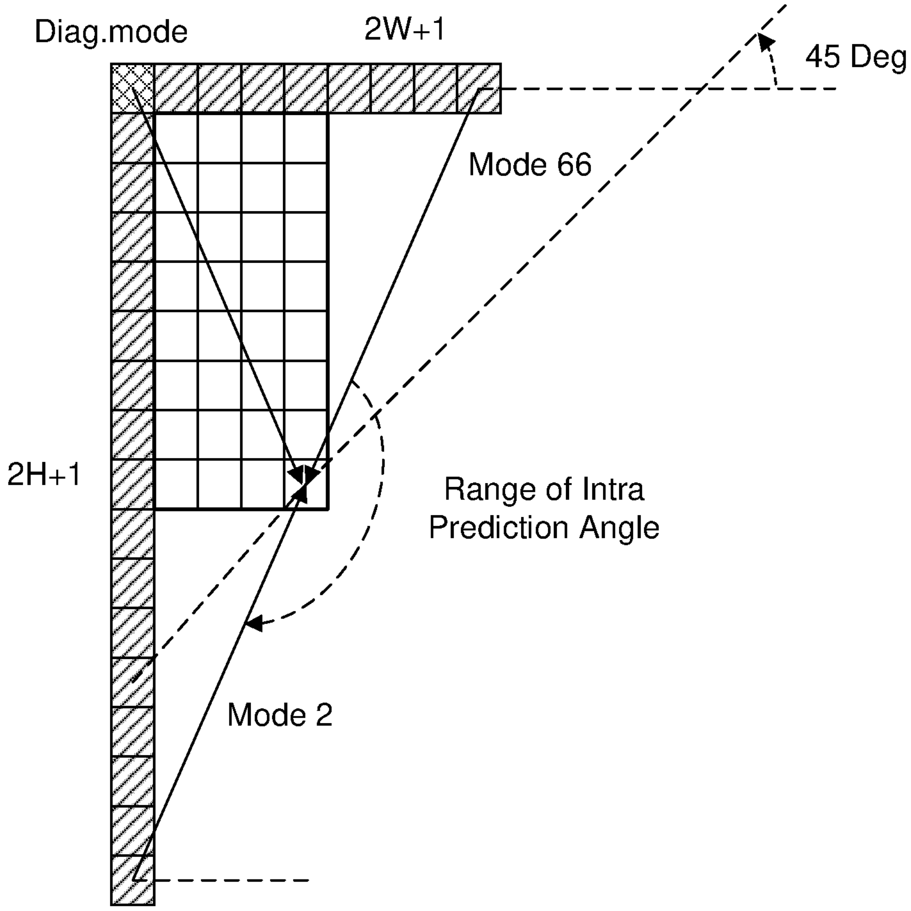

For a current W×H block to be predicted, FIG. 8 illustrates a set of decoded reference samples, made of an array of top decoded reference samples of length 2 W+1 and an array of left decoded reference samples of length 2H+1. FIG. 8 also shows the relationship between the extent of the decoded reference samples around the current W×H block and the range of allowed intra prediction angles. Table 1 presents the indices of the intra prediction modes replaced by wide-angular modes in VVC and ECM, depending on the size of the current block to be predicted.

TABLE 1 indices of the intra prediction modes replaced by wide-angular modes in VVC and ECM (67 core intra prediction modes).

| condition | replaced intra prediction modes indices |
|---|---|
| W/H == 2 | 2, 3, 4, 5, 6, 7 |
| W/H == 4 | 2, 3, 4, 5, 6, 7, 8, 9, 10, 11 |
| W/H == 8 | 2, 3, 4, 5, 6, 7, 8, 9, 10, 11, 12, 13 |
| W/H == 16 | 2, 3, 4, 5, 6, 7, 8, 9, 10, 11, 12, 13, 14, 15 |
| W/H == 32 | 2, 3, 4, 5, 6, 7, 8, 9, 10, 11, 12, 13, 14, 15, 16 |
| W/H == 1 | none |
| H/W == 2 | 61, 62, 63, 64, 65, 66 |
| H/W == 4 | 57, 58, 59, 60, 61, 62, 63, 64, 65, 66 |
| H/W == 8 | 55, 56, 57, 58, 59, 60, 61, 62, 63, 64, 65, 66 |
| H/W == 16 | 53, 54, 55, 56, 57, 58, 59, 60, 61, 62, 63, 64, 65, 66 |
| H/W == 32 | 52, 53, 54, 55, 56, 57, 58, 59, 60, 61, 62, 63, 64, 65, 66 |

Figure 9:
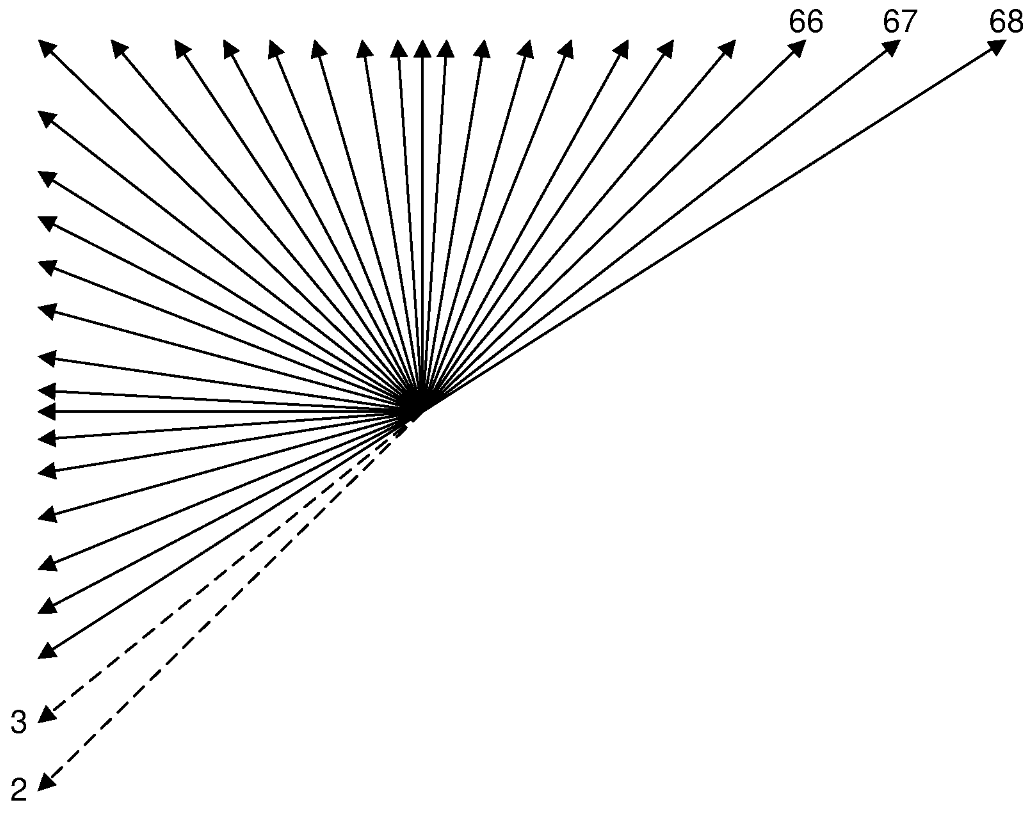
FIG. 9 illustrates an example of angular modes replaced by wide angular modes for a non-square block whose width is strictly larger than its height, in VVC and ECM.

FIG. 9 shows an example of how angular intra modes are replaced by wide angular modes for a non-square block whose width is strictly larger than its height. In this example, mode 2 is replaced by wide angle mode 67. Mode 3 is replaced by wide angle mode 68. For instance, if the current block to be predicted is 8×4, this process of substitution will go on incrementally until mode 7 is replaced by wide angle mode 72.

Template-Based Intra Mode Derivation (TIMD)

Figure 10:
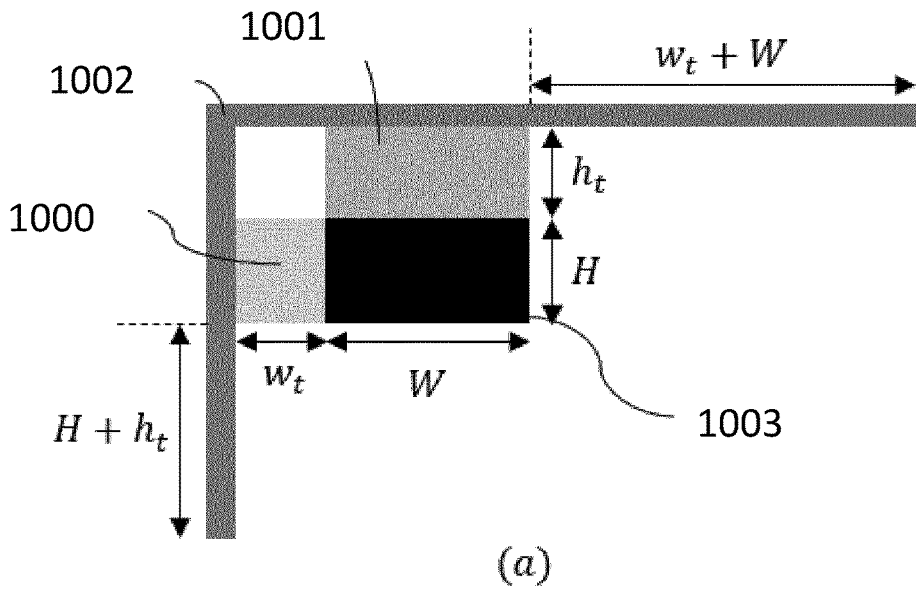
FIG. 10 illustrates examples of a template of a luminance CB and decoded reference samples of the template used in a template-based intra mode derivation (TIMD).
Figure 10:
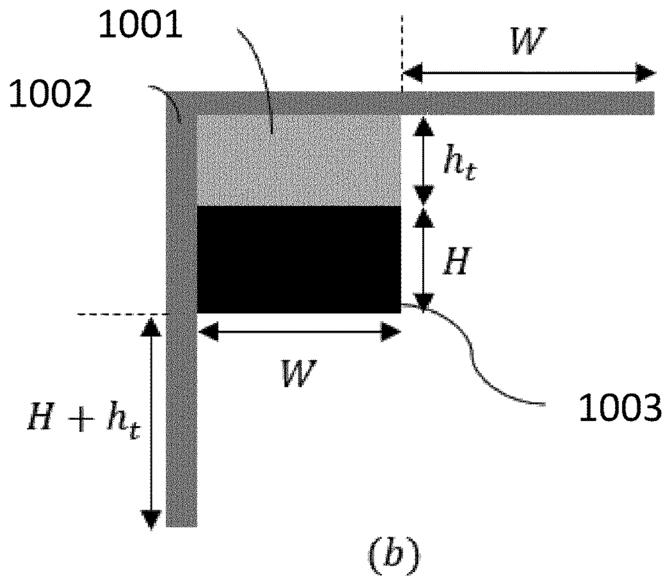
Figure 10:
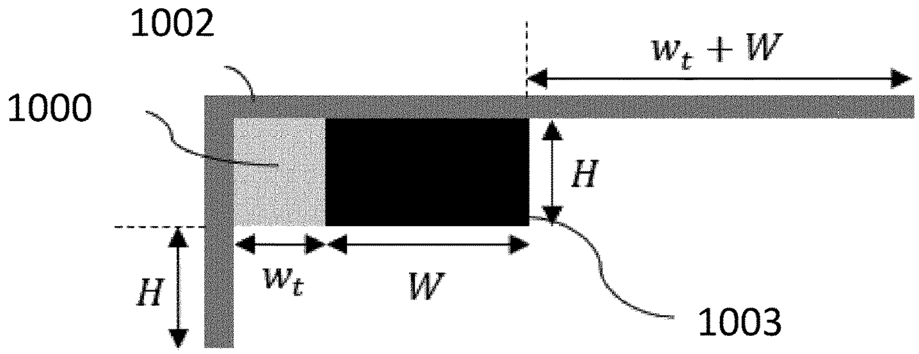

For a given luminance CB (1003) in FIG. 10 (*a*), the following modes derivation via TIMD applies the same way on the encoder and decoder sides. For each intra prediction mode in the MPM list of this luminance CB, if needed, supplemented with default modes, the TIMD mode determines a prediction of the template (1000 and 1001) of the luminance CB (1003) from the decoded reference samples of the template (1002), and the SATD between the predicted reference samples of the template and the decoded reference samples of the template of the luminance CB is determined. In a first pass, the two intra prediction modes with the minimum SATDs are selected as the TIMD modes. This means that the set of possible intra prediction modes derived via TIMD gathers 131 modes. After retaining two intra prediction modes in the first pass involving the MPM list supplemented with default modes, for each of these two selected intra prediction modes, if this mode is neither PLANAR nor DC, TIMD also checks in terms of SATD cost, two closest extended directional intra prediction modes for the selected intra prediction modes. In this second pass, the set of directional intra prediction modes is extended from 65 to 129, by inserting a direction between each black arrow and its neighboring dotted black arrow in FIG. 4, providing the extended directional intra prediction modes.

Note that, in the above description, it is assumed that the template of the luminance CB does not go out of the bounds of the current frame. In the case where at least one portion of the template of the luminance CB goes out of the bounds of the current frame, FIGS. 10(*b*) and (*c*) illustrates how the template is adapted.

In FIG. 10(*a*), the current W×H luminance CB (1003) is surrounded by its fully available template, made of a $w_t$×H portion on its left side (1000) and a W×$h_t$ portion above it (1001). During the TIMD derivation step, a tested intra prediction mode predicts the template of the current luminance CB from the set of $1+2w_t+2W+2h_t+2H$ decoded reference samples (1002) of the template. In the current version of ECM (ECM-4.0), $w_t$ equals 2 if W≤8, $w_t$ equals 4 otherwise. $h_t$ equals 2 if H≤8, $h_t$ equals 4 otherwise. In FIG. 10 (*b*), the current W×H luminance CB (1003) is surrounded by its template with only its W×$h_t$ portion above it (1001) available. During the TIMD derivation step, a tested intra prediction mode predicts the template of the current luminance CB from the set of $1+2W+2h_t+2H$ decoded reference samples (1002) of the template. In FIG. 10 (*c*), the current W×H luminance CB (1003) is surrounded by its template with only its $w_t$×H portion on its left side (1000) available. During the TIMD derivation step, a tested intra prediction mode predicts the template of the current luminance CB from the set of $1+2w_t+2W+2H$ decoded reference samples (1002) of the template.

To predict the current luminance CB via TIMD, the two intra predictions obtained from the two TIMD modes selected in the first or second pass for the luminance CB are fused with weights after applying PDPC. The used weights depend on the prediction SATDs of the two TIMD modes.

Since for TIMD the set of directional intra prediction modes is extended from 65 to 129, the intra prediction modes substitution in WAIP is adapted. Table 1 is adapted to Table 2. For instance, for a given 8×4 luminance CB using TIMD, mode 2 is replaced by wide angle mode 131, mode 3 is replaced by wide angle mode 132, mode 4 is replaced by wide angle mode 133, . . . , mode 12 is replaced by wide angle mode 141.

TABLE 2 indices of the intra prediction modes replaced by wide-angular modes in TIMD in ECM.

| condition | replaced intra prediction modes indices |
|---|---|
| W/H = 2 | $[\![2, 12]\!]$ |
| W/H = 4 | $[\![2, 20]\!]$ |
| W/H = 8 | $[\![2, 24]\!]$ |
| W/H = 16 | $[\![2, 28]\!]$ |
| W/H = 32 | $[\![2, 30]\!]$ |
| W/H = 1 | none |
| H/W = 2 | $[\![120, 130]\!]$ |
| H/W = 4 | $[\![112, 130]\!]$ |
| H/W = 8 | $[\![108, 130]\!]$ |
| H/W = 16 | $[\![104, 130]\!]$ |
| H/W = 32 | $[\![102, 130]\!]$ |

Matrix-Based Intra Prediction (MIP)

Figure 11:
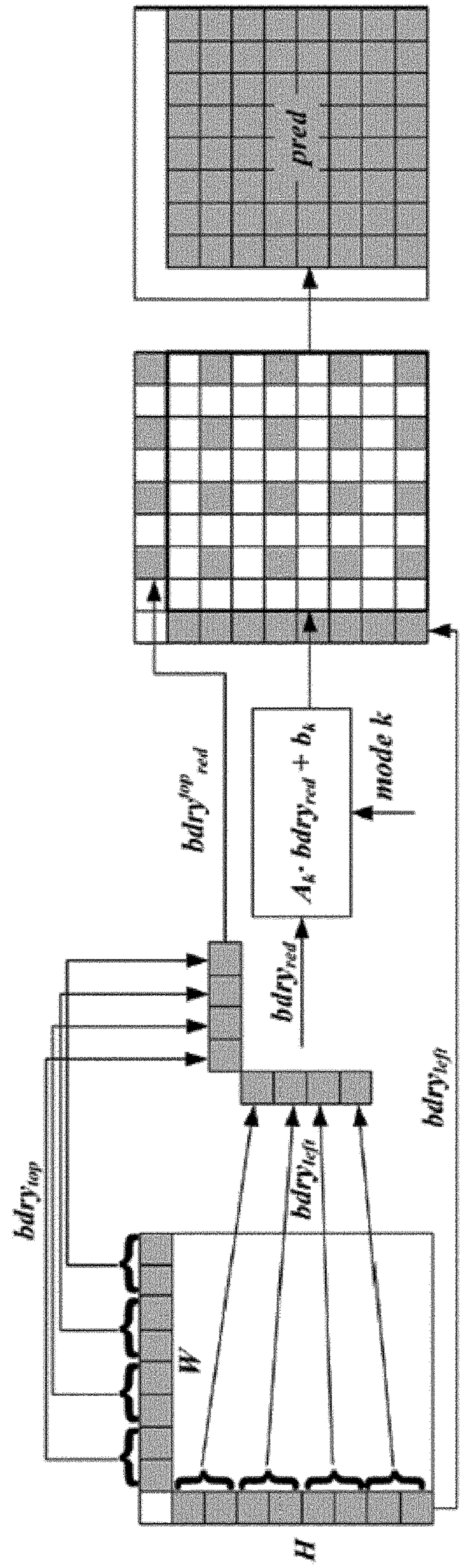
FIG. 11 illustrates an example of a matrix-based intra prediction process for an input block of height H and width W.

Matrix-based Intra Prediction (MIP) method is a newly added intra prediction technique to VVC. For predicting the samples of a rectangular block of width W and height H, MIP takes one column of H reconstructed neighboring boundary samples on the left side of the current block and one line of W reconstructed neighboring boundary samples above the current block as input. If the reconstructed samples are unavailable, they are generated as done in the conventional intra prediction. The generation of the prediction signal is based on the following three steps: optional averaging of the reconstructed neighboring boundary samples, matrix vector multiplication between a MIP weight matrix and the averaged neighboring boundary samples, and optional linear interpolation of the result from the previous multiplication, as shown in FIG. 11.

In ECM, up to ECM-4.0, MIP has not been modified with respect to its implementation in VVC.

Decoder Side Intra Mode Derivation (DIMD)

For a given luminance CB to be predicted, DIMD derives two intra prediction modes from the template of reconstructed neighboring samples surrounding this luminance CB, and those two intra predictors are combined with the planar mode predictor using weights derived from the gradients determined in the template. The division operations in weight derivation are performed utilizing the same lookup table (LUT) based integerization scheme used by the Cross Component Linear Model (CCLM). For example, the division operation in the orientation calculation $$\text{Orient} = G_y / G_x$$

is computed by the following LUT-based scheme:

$$x = \text{Floor}(\text{Log}\,2(Gx))$$

$$normDiff = ((Gx \ll 4) \gg x)\,\&15$$

$$x \mathrel{+}= (3 + (normDiff \mathrel{!}= 0)\,?\,1 : 0)$$

$$\text{Orient} = (Gy * (DivSigTable[normDiff]\,|\,8) + (1 \ll (x-1))) \gg x$$

where $$DivSigTable[16] = \{0, 7, 6, 5, 5, 4, 4, 3, 3, 2, 2, 1, 1, 1, 1, 0\}.$$

The two derived intra prediction modes are included into the primary list of MPMs. Consequently, for a given luminance CB to be predicted, the DIMD process is performed before creating the MPM list. For a given luminance CB, the primary derived intra prediction mode via DIMD is stored, and it is used for the MPM list construction of the neighboring luminance CBs.

Geometric Partition Mode (GPM)

In VVC and ECM, a geometric partitioning mode is supported for inter prediction. The geometric partitioning mode is signaled using a CU-level flag as one kind of merge mode, with other merge modes including the regular merge mode, the MMVD mode, the CIIP mode and the subblock merge mode. In total 64 partitions are supported by geometric partitioning mode for each possible CU size $w \times h = 2^m \times 2^n$ with $m,n \in \{3 \ldots 6\}$ excluding 8×64 and 64×8.

Figure 12:
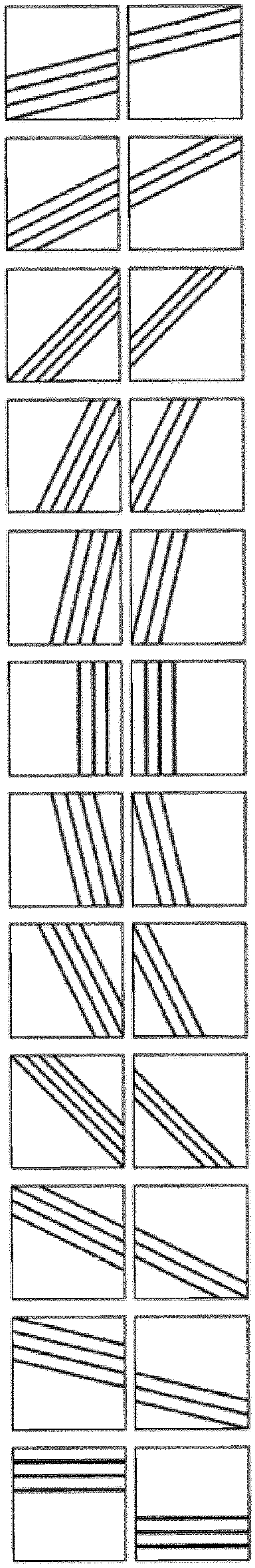
FIG. 12 illustrates examples of the GPM splits grouped by identical angles.

When the GPM mode is used, a CU is split into two parts by a geometrically located straight line. Some examples are illustrated in FIG. 12. The location of the splitting line is mathematically derived from the angle and offset parameters of a specific partition. Each part of a geometric partition in the CU is inter-predicted using its own motion; only uni-prediction is allowed for each partition, that is, each part has one motion vector and one reference index. The uni-prediction motion constraint is applied to ensure that same as the conventional bi-prediction, only two motion compensated prediction are needed for each CU.

If geometric partitioning mode is used for the current CU, then a geometric partition index indicating the partition mode of the geometric partition (angle and offset), and two merge indices (one for each partition) are further signaled. The number of maximum GPM candidate size is signaled explicitly in SPS and specifies syntax binarization for GPM merge indices. After predicting each of part of the geometric partition, the sample values along the geometric partition edge are adjusted using a blending processing with adaptive weights. This is the prediction signal for the whole CU and transform and quantization process is applied to the whole CU as in other prediction modes.

Blending Along the Geometric Partitioning Edge

After predicting each part of a geometric partition using its own motion, blending is applied to the two prediction signals to derive samples around geometric partition edge. The blending weight for each position of the CU are derived based on the distance between individual position and the partition edge.

The distance for a position (x,y) to the partition edge are derived as:

$$d(x, y) = (2x + 1 - w)\cos(\varphi_i) + (2y + 1 - h)\sin(\varphi_i) - \rho_j$$

$$\rho_j = \rho_{x,j}(\varphi_i) + \rho_{y,j}\sin(\varphi_i)$$

$$\rho_{x,j} = \begin{cases} 0 & i\ \%\ 16 = 8 \text{ or } (i\ \%\ 16 \neq 0 \text{ and } h \geq w) \\ \pm(j \times w) \gg 2 & \text{otherwise} \end{cases}$$

$$\rho_{y,j} = \begin{cases} 0 & i\ \%\ 16 = 8 \text{ or } (i\ \%\ 16 \neq 0 \text{ and } h \geq w) \\ \pm(j \times w) \gg 2 & \text{otherwise} \end{cases}$$

where i,j are the indices for angle and offset of a geometric partition, which depend on the signaled geometric partition index. The sign of $p_{x,j}$ and $p_{y,j}$ depend on angle index i.

The weights for each part of a geometric partition are derived as following:

$$wIdxL(x, y) = partIDx\,?\,32 + d(x, y) : 32 - d(x, y)$$

$$w_0(x, y) = \frac{\text{Clip3}(0, 8(wIdxL(x, y) + 4) \gg 3)}{8}$$

$$w_1(x, y) = 1 - w_0(x, y)$$

Figure 13:
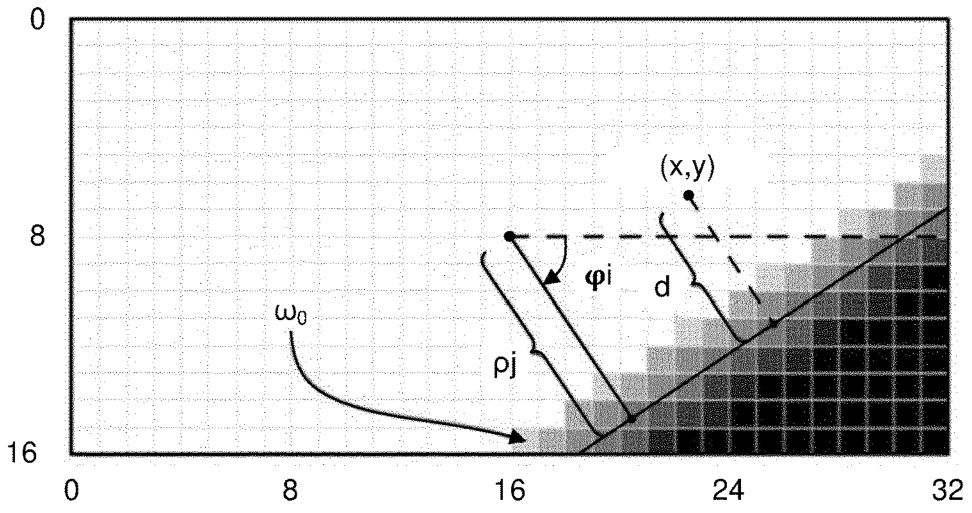
FIG. 13 illustrates an example of a blending weight $w_0$ used in geometric partitioning mode.

The partIdx depends on the angle index i. One example of weigh $w_0$ is illustrated in FIG. 13.

GPM Intra

In Exploration Experiment in ECM-3.1 for ECM-4.0, a GPM intra prediction mode is provided wherein intra prediction modes are added to GPM to combine an inter prediction with an intra prediction. Four tests were conducted.

Figure 14:
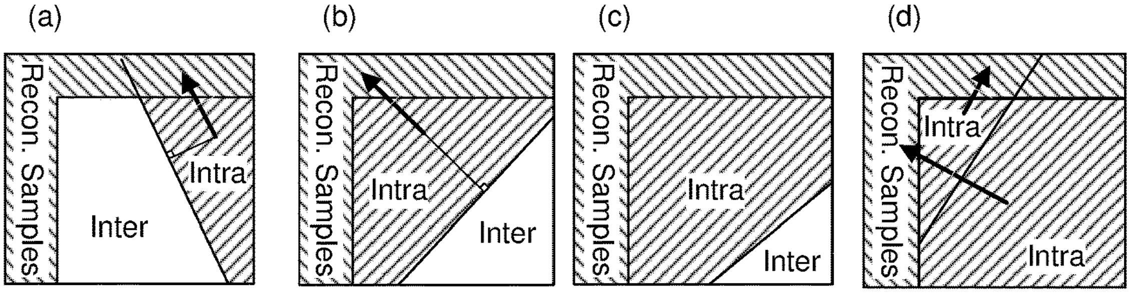
FIG. 14 illustrates examples of available intra prediction modes that can be used in geometric partitioning mode.

In a first variant (test a), GPM with inter and intra prediction is provided. In GPM with inter and intra prediction, the final prediction samples are generated by weighting inter predicted samples and intra predicted samples for each GPM-separated region. The inter predicted samples are derived by the same scheme as the GPM in the current ECM whereas the intra predicted samples are derived by an intra prediction mode (IPM) candidate list and an index signaled from the encoder. The IPM candidate list size is pre-defined as 3. The available IPM candidates are the parallel angular mode against the GPM block boundary (Parallel mode), the perpendicular angular mode against the GPM block boundary (Perpendicular mode), and the Planar mode as shown FIG. 14 (*a*)-(*c*), respectively. Furthermore, GPM with intra and intra prediction as shown in FIG. 14 (*d*) is restricted in the GPM with intra to reduce the signaling overhead for IPMs and avoid an increase in the size of the intra prediction circuit on the hardware decoder. In addition, a direct motion vector and IPM storage on the GPM-blending area is introduced to further improve the coding performance.

In a second variant (test b), the following two modifications are introduced into the first variant to achieve more coding performance: DIMD and neighboring mode based IPM derivation, Combination of GPM-intra and GPM-MMVD.

The IPM candidate list size is the same as the first variant and the Parallel mode is registered first. Therefore, maximum two IPM candidates derived from the decoder-side intra mode derivation (DIMD) method in the ECM-3.1 and/or the neighboring blocks can be registered if there is not the same IPM candidate in the list. As for the neighboring mode derivation, there are five positions for available neighboring blocks at most, but they are restricted by the angle of GPM block boundary as shown in Table 3 below, which has been already used for GPM with template matching (GPM-TM) in the ECM-3.1.

Different from the first variant, GPM with intra prediction (GPM-intra) can be utilized with GPM with merge with motion vector difference (GPM-MMVD) which has been already implemented in the ECM-3.1.

TABLE 3

The position of available neighboring blocks for IPM candidate derivation based on the angle of GPM block boundary. A and L denotes the above and left side of the prediction block.

| Angle of GPM | 0 | 2 | 3 | 4 | 5 | 8 | 11 | 12 | 13 | 14 |
|---|---|---|---|---|---|---|---|---|---|---|
| 1st partition | A | A | A | A | L + A | L + A | L + A | L + A | A | A |
| 2nd partition | L + A | L + A | L + A | L | L | L | L | L + A | L + A | L + A |
| **Angle of GPM** | **16** | **18** | **19** | **20** | **21** | **24** | **27** | **28** | **29** | **30** |
| 1st partition | A | A | A | A | L + A | L + A | L + A | L + A | A | A |
| 2nd partition | L + A | L + A | L + A | L | L | L | L | L + A | L + A | L + A |

In a third variant (test c), template-based intra mode derivation (TIMD) in the ECM-3.1 can be additionally utilized for IPM candidates of GPM-intra to further improve the coding performance. The IPM candidate list size is also the same as the first variant. The Parallel mode can be registered first, then IPM candidates of TIMD, DIMD, and neighboring blocks in this order.

In a fourth variant (test d), GPM-intra with GPM with template matching (GPM-TM) can be utilized in addition to the third variant to increase the application rates of GPM-intra blocks.

Intra Block Copy (IBC)

Intra block copy (IBC) is a tool adopted in HEVC extensions on SCC. The IBC tool significantly improves the coding efficiency of screen content materials. Since IBC mode is implemented as a block level coding mode, block matching (BM) is performed at the encoder to find the optimal block vector (or motion vector) for each CU. Here, a block vector is used to indicate the displacement from the current block to a reference block, which is already reconstructed inside the current picture. The luma block vector of an IBC-coded CU is in integer precision. The chroma block vector rounds to integer precision as well. When combined with AMVR, the IBC mode can switch between 1-pel and 4-pel motion vector precisions. An IBC-coded CU is treated as the third prediction mode other than intra or inter prediction modes. The IBC mode is applicable to the CUs with both width and height smaller than or equal to 64 luma samples.

At the encoder side, hash-based motion estimation is performed for IBC. The encoder performs RD check for blocks with either width or height no larger than 16 luma samples. For non-merge mode, the block vector search is performed using hash-based search first. If hash search does not return valid candidate, block matching based local search will be performed.

In the hash-based search, hash key matching (32-bit CRC) between the current block and a reference block is extended to all allowed block sizes. The hash key calculation for every position in the current picture is based on 4×4 subblocks. For the current block of a larger size, a hash key is determined to match that of the reference block when all the hash keys of all 4×4 subblocks match the hash keys in the corresponding reference locations. If hash keys of multiple reference blocks are found to match that of the current block, the block vector costs of each matched reference are calculated and the one with the minimum cost is selected.

In block matching search, the search range is set to cover both the previous and current CTUs. At CU level, IBC mode is signaled with a flag and it can be signaled as IBC AMVP mode or IBC skip/merge mode as follows:

IBC skip/merge mode: a merge candidate index is used to indicate which of the block vectors in the list from neighboring candidate IBC coded blocks is used to predict the current block. The merge list consists of spatial, HMVP, and pairwise candidates.

IBC AMVP mode: block vector difference is coded in the same way as a motion vector difference. The block vector prediction method uses two candidates as predictors, one from left neighbor and one from above neighbor (if IBC coded). When either neighbor is not available, a default block vector will be used as a predictor. A flag is signaled to indicate the block vector predictor index.

IBC Reference Region

Figure 15:
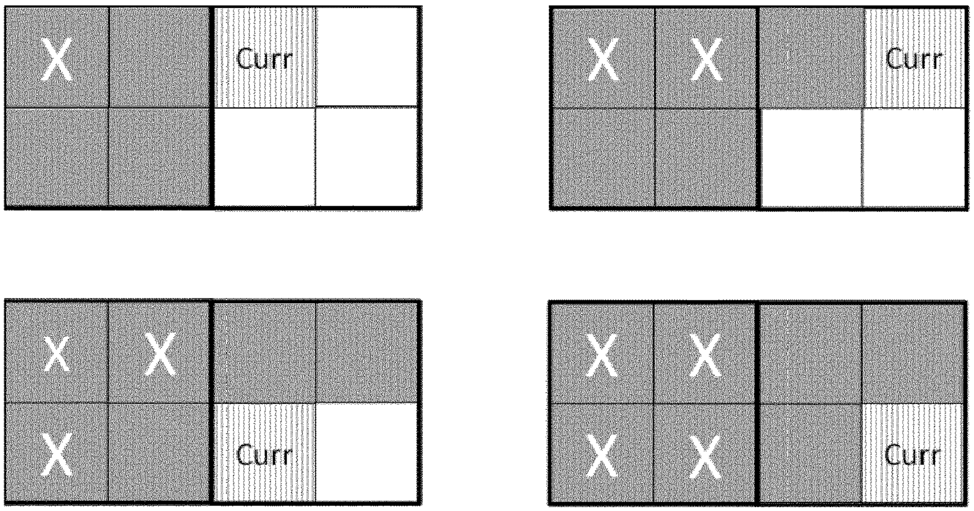
FIG. 15 illustrates an example of a current CTU (coding tree unit) processing order and its available reference samples in the current and left CTU.

To reduce memory consumption and decoder complexity, the IBC in VVC allows only the reconstructed portion of the predefined area including the region of current CTU and some region of the left CTU. FIG. 15 illustrates an example of the reference region of IBC Mode, where each block represents 64×64 luma sample unit. The current block Curr to predict is show with striped, the grey blocks correspond to the reconstructed blocks, and blocks with an X mark are blocks in the reconstructed area that are not available for IBC. As shown in FIG. 15, depending on the location of the current coding CU location within the current CTU, the following applies:

If current block falls into the top-left 64×64 block of the current CTU, then in addition to the already reconstructed samples in the current CTU, it can also refer to the reference samples in the bottom-right 64×64 blocks of the left CTU, using CPR mode. The current block can also refer to the reference samples in the bottom-left 64×64 block of the left CTU and the reference samples in the top-right 64×64 block of the left CTU, using CPR mode.

If current block falls into the top-right 64×64 block of the current CTU, then in addition to the already reconstructed samples in the current CTU, if luma location (0, 64) relative to the current CTU has not yet been reconstructed, the current block can also refer to the reference samples in the bottom-left 64×64 block and bottom-right 64×64 block of the left CTU, using CPR mode; otherwise, the current block can also refer to reference samples in bottom-right 64×64 block of the left CTU.

If current block falls into the bottom-left 64×64 block of the current CTU, then in addition to the already reconstructed samples in the current CTU, if luma location (64, 0) relative to the current CTU has not yet been reconstructed, the current block can also refer to the reference samples in the top-right 64×64 block and bottom-right 64×64 block of the left CTU, using CPR mode. Otherwise, the current block can also refer to the reference samples in the bottom-right 64×64 block of the left CTU, using CPR mode.

If current block falls into the bottom-right 64×64 block of the current CTU, it can only refer to the already reconstructed samples in the current CTU, using CPR mode.

This restriction allows the IBC mode to be implemented using local on-chip memory for hardware implementations.

IBC Adaptations for Camera Captured Content

IBC is an effective tool for screen content coding. It also shows coding efficiency improvement for some camera-capture contents at the cost of significant amount of encoding time increase. An IBC adaption scheme based on EE2-3.2 software is described below. This adaptation shows that IBC can obtain good coding gains at a controllable increase of encoding time.

Figure 16:
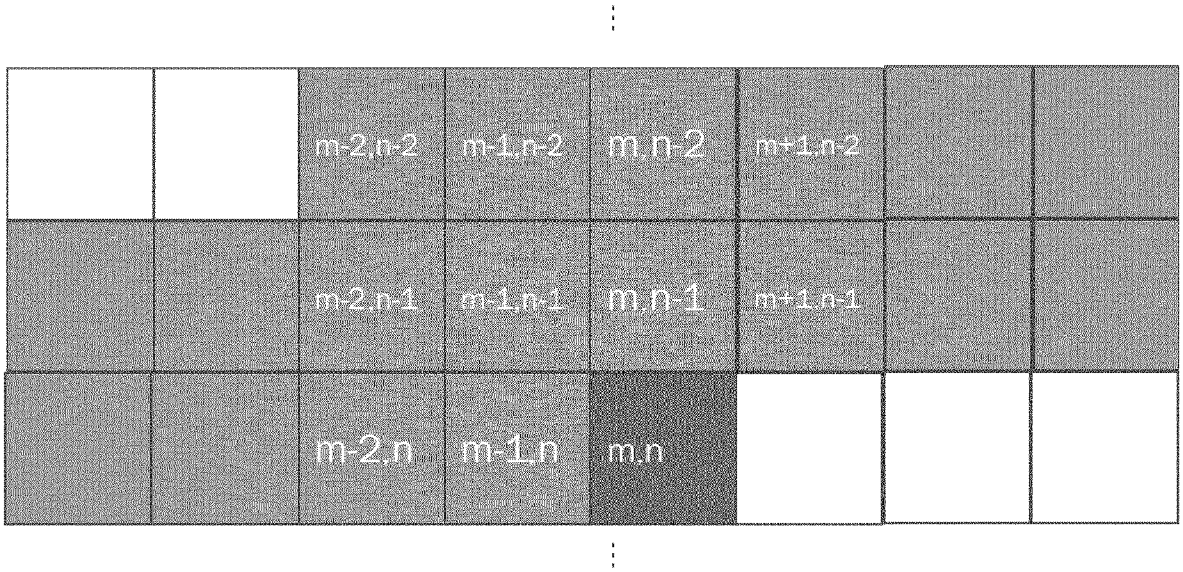
FIG. 16 illustrates an example of a reference area for IBC mode when the CTU size is 128×128. Grey blocks denote the available reference area while white blocks denote invalid reference area.

The decoder is exactly the same as EE2-3.2 when CTU size is 128×128. It means that the reference area for IBC is extended to two CTU-rows above the current CTU, as shown in FIG. 16. Specifically, for CTU (m,n) to be coded, the reference area includes CTUs with index (m−2,n−2) . . . (W,n−2),(0,n−1) . . . (W,n−1),(0,n) . . . (m,n), where W denotes the maximum horizontal index within the current picture.

Figure 17:
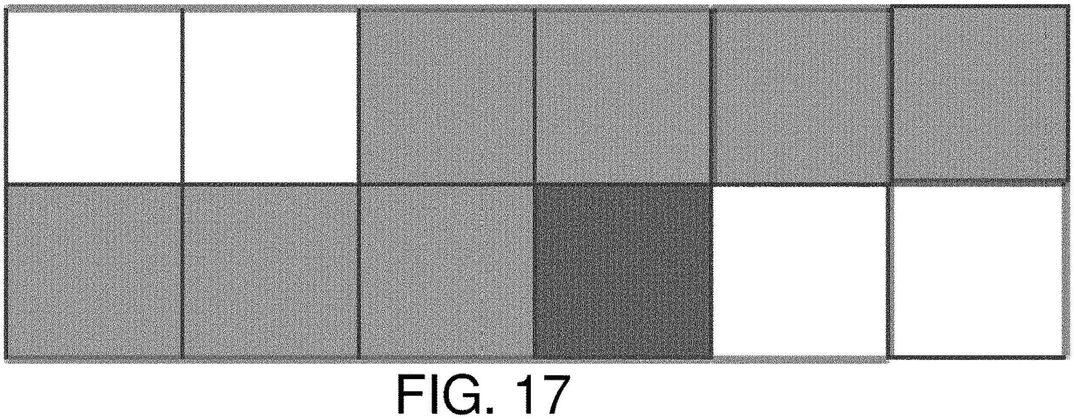
FIG. 17 illustrates an example of a reference area for IBC when the CTU is 256×256.
Figure 18:
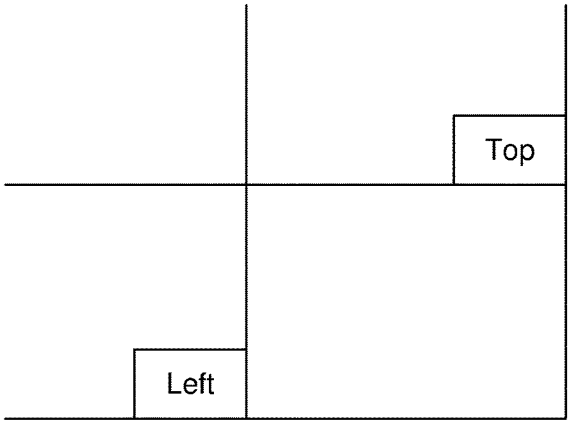
FIG. 18 illustrates an example of top and left neighboring blocks used in a CIIP weight derivation.

However, when CTU size is 256×256, two additional rows of CTU above may require extra memory. To keep IBC from using extra memory, when CTU size is 256×256, the reference area is shown in FIG. 17. Specifically, assume that the current CTU index is (m, n), the reference area includes CTUs with index (0,n) . . . (m,n) and (m−1,n−1) . . . (W,n−1) as shown in lighter grey blocks in FIG. 17, the darker grey block being the current CTU (m,n).

Besides the change of EE2-3.2 decoder when CTU size is 256×256, the encoder of EE2-3.2 is modified to limit the per-sample block vector search (or called local search) range to be [−12,12] horizontally and [−12,12] vertically centered at the first block vector predictor for each IBC block.

Combined Intra Inter Prediction (CIIP)

In VVC and ECM, when a CU is coded in merge mode, if the CU contains at least 64 luma samples (that is, CU width times CU height is equal to or larger than 64), and if both CU width and CU height are less than 128 luma samples, an additional flag is signaled to indicate if the combined inter/intra prediction (CIIP) mode is applied to the current CU. As its name indicates, the CIIP prediction combines an inter prediction signal with an intra prediction signal. The inter prediction signal in the CIIP mode $P_{inter}$ is derived using the same inter prediction process applied to regular merge mode; and the intra prediction signal $P_{intra}$ is derived following the regular intra prediction process with the planar mode. Then, the intra and inter prediction signals are combined using weighted averaging, where the weight value is calculated depending on the coding modes of the top and left neighboring blocks (depicted in FIG. 18) as follows:

If the top neighbor is available and intra coded, then set isIntraTop to 1, otherwise set isIntraTop to 0;

If the left neighbor is available and intra coded, then set isIntraLeft to 1, otherwise set isIntraLeft to 0;

If (isIntraLeft+isIntraTop) is equal to 2, then wt is set to 3;

Otherwise, if (isIntraLeft+isIntraTop) is equal to 1, then wt is set to 2;

Otherwise, set wt to 1.

The CIIP prediction is formed as follows:

$$P_{CIIP} = ((4 - wt) * P_{inter} + wt * P_{intra} + 2) >> 2$$

Embodiments of methods and apparatuses for encoding or decoding a block of an image or a video are described herein in relation with FIG. 19-26, wherein the block is predicted based on a combination of a first predictor block and a second predictor block, the first and second predictor blocks being respectively obtained from a first intra prediction mode and a second intra prediction mode. In the following, the mode of predicting the block based on such a combination in any one of the embodiments described herein is called luma intra fusion.

Any one of the embodiments described herein can be implemented in an intra prediction module of an image or video encoder/decoder, such as the intra prediction module 260 of the encoder 200 and the intra prediction module 360 of the decoder 300.

In an embodiment, the first intra prediction mode is obtained from among a first set of intra prediction modes and the second intra prediction mode is obtained from among a second set of intra prediction modes, the first and second intra prediction modes being distinct. In a variant, the first and second sets of intra prediction modes are also distinct.

In an embodiment, a first set of intra prediction modes includes non-direction-based intra prediction modes, and a second set of intra prediction modes includes directional intra prediction modes (IPM). One of the first intra prediction mode and the second intra prediction mode is obtained from the first set of intra prediction modes, and the other of the first intra prediction mode and the second intra prediction mode is obtained from the second set of intra prediction modes. For instance, the first set of intra prediction modes comprises one or more of the following intra prediction modes: a Planar mode, a DC mode, a MIP mode, an IBC mode. In a variant, when included in the first set of intra prediction modes, the MIP mode is an adapted MIP mode using matrices that are specifically trained for not capturing directional features of the block. In another variant, the first set of intra prediction modes can also comprise any other intra prediction mode that does not capture the directional features of the block or that captures only lower frequencies of the signal of the block.

For instance, the second set of intra prediction modes comprises one or more of the directional intra prediction modes, such as one or more of following intra prediction modes: one or mode of the 67 directional intra prediction modes of VVC, or ECM, one or more of the extended directional intra prediction modes of the TIMD mode, one or more of the wide angle intra prediction mode, a directional intra prediction mode parallel to a partition edge of a geometric partition mode, a directional intra prediction mode perpendicular to a partition edge of a geometric partition mode, an adapted MIP mode that uses matrices trained to gather only directional features of a block, or an intra prediction mode provided by a DIMD or TIMD process. The second set of intra prediction modes can also comprise any other intra prediction mode that captures one or more directional features of the block, or that captures high frequencies of the signal of the block.

It is understood that unless stated otherwise, any one of the embodiments described above and below can be combined with any other embodiment or embodiments described above and below.

Figure 19A:
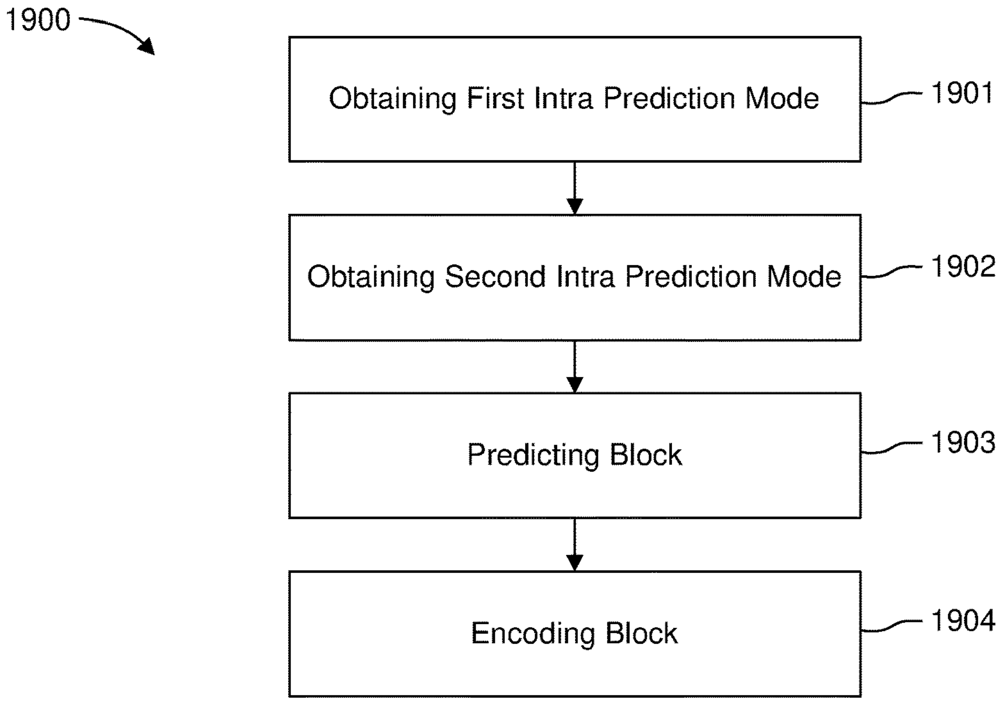
FIG. 19A illustrates an example of a method for encoding a block of an image or a video according to an embodiment.

FIG. 19A illustrates an example of a method 1900 for encoding a block of an image or a video according to an embodiment. At 1901, a first predictor block is obtained from a first intra prediction mode. In a variant, the first intra prediction mode can be determined by testing the intra prediction mode of the first set of intra prediction modes, determining a rate-distortion cost for each of the intra prediction mode of the first set and selecting the best intra prediction mode in terms of rate-distortion. At 1902, a second predictor block is obtained from a second intra prediction mode. In a variant, the second intra prediction mode can be determined by testing the intra prediction mode of the second set of intra prediction modes in a same manner as for the first intra prediction mode. In another variant, the second intra prediction modes can be derived from reconstructed samples neighboring the block. Other variants are described further below for determining the second prediction mode. At 1903, the luma intra fusion prediction is obtained, that is a prediction is obtained for the block by combining the first block predictor and the second block predictor. Embodiments for combining the first block predictor and the second block predictor are described further below. At 1904, the block is encoded using the prediction from the luma intra fusion.

Figure 19B:
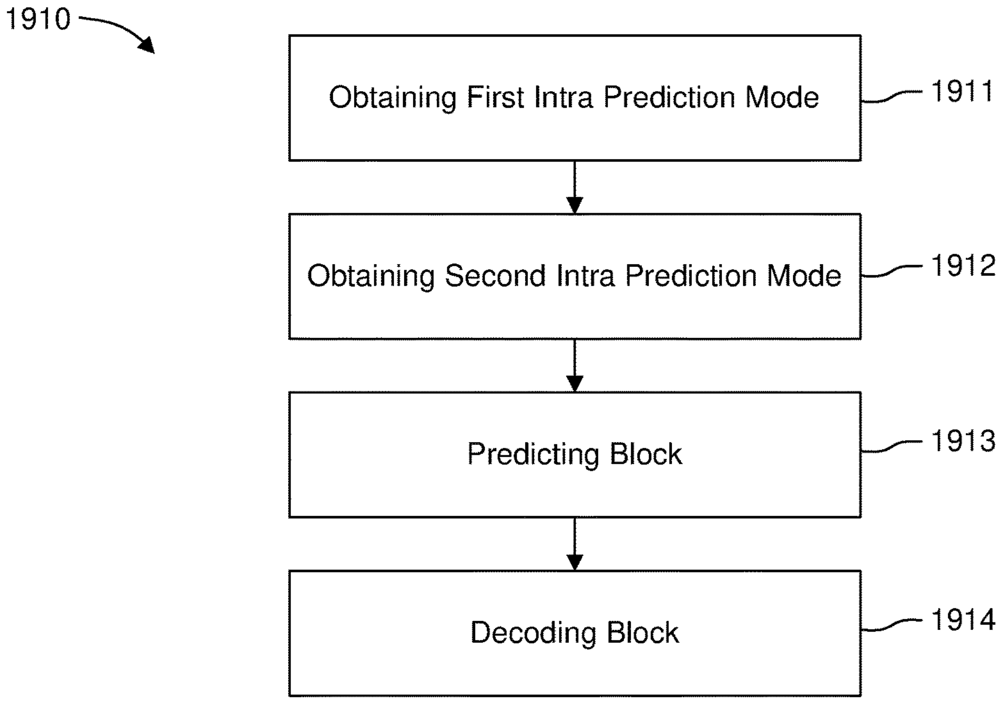
FIG. 19B illustrates an example of a method for decoding a block of an image or a video according to an embodiment.

FIG. 19B illustrates an example of a method 1910 for decoding a block of an image or a video according to an embodiment. At 1911, a first predictor block is obtained from a first intra prediction mode. As an example, the first intra prediction mode can be determined by decoding a syntax element from a bitstream indicating the first intra prediction mode. At 1912, a second predictor block is obtained from a second intra prediction mode. In a variant, the second intra prediction mode can be determined by decoding one or more syntax elements providing for the second intra prediction modes. In another variant, the second intra prediction mode can be derived at the decoder side in a same manner as in the encoder side. Some variants are described further below for determining the second intra prediction mode. At 1913, the luma intra fusion prediction is obtained for the block by combining the first block predictor and the second block predictor. Embodiments for combining the first block predictor and the second block predictor are described further below. At 1914, the block is decoded/reconstructed using the prediction from the luma intra fusion.

Figure 20A:
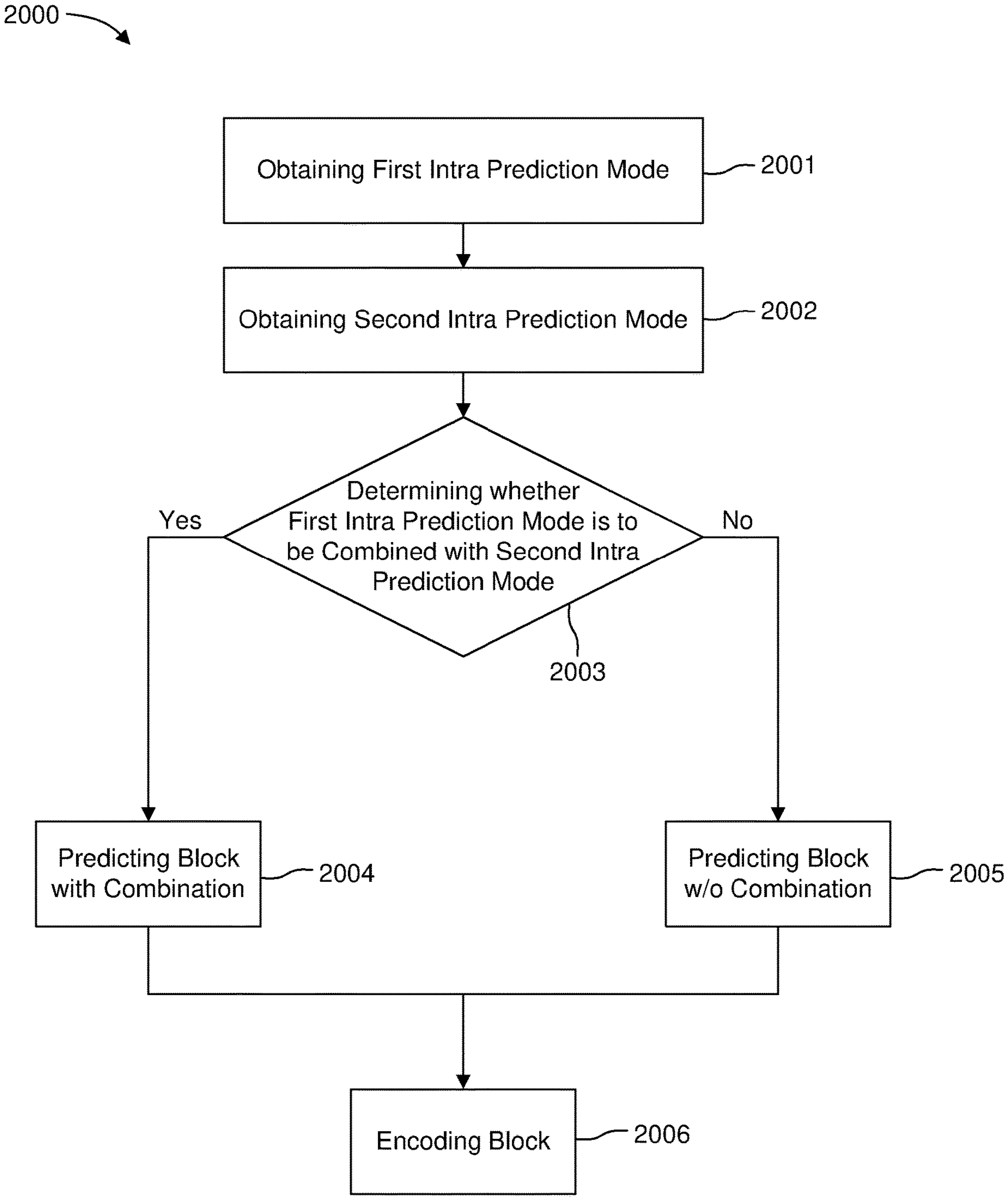
FIG. 20A illustrates an example of a method for encoding a block of an image or a video according to another embodiment.

FIG. 20A illustrates an example of a method 2000 for encoding a block of an image or a video according to another embodiment. In this embodiment, the determination of the prediction using the luma intra fusion is responsive to a determination whether the two intra prediction modes are to be combined. At 2001, a first predictor block is obtained from a first intra prediction mode. In a variant, the first intra prediction mode can be determined in a same manner as in the embodiment described in relation with FIG. 19A. At 2002, a second predictor block is obtained from a second intra prediction mode. In a variant, the second intra prediction mode can be determined in a same manner as in the embodiment described in relation with FIG. 19A or using any other variants described further below. At 2003, it is determined whether the first intra prediction mode is to be combined or fused with the second intra prediction mode. In other words, it is determined whether the first predictor block is to be combined with the second predictor block.

For example, it is determined that the first intra prediction mode is to be combined with the second intra prediction mode based on a cost. In this variant, the cost is obtained when determining the second intra prediction mode, for instance the cost is determined when each intra prediction mode in the second set of intra prediction mode is tested or when the second intra prediction mode is determined using a TIMD process. Other variants can be used for determining whether the first and second intra prediction modes are to be combined.

If it is determined at 2003 that the first intra prediction mode is to be combined with the second intra prediction, then at 2004, the prediction for the block is obtained by combining the first block predictor and the second block predictor. Embodiments for combining the first block predictor and the second block predictor are described further below.

If it is determined at 2003 that the first intra prediction mode is not to be combined with the second intra prediction, then at 2005, the prediction for the block is obtained without combining the first block predictor and the second block predictor. The prediction for the block can be obtained from the first block predictor or any other prediction, such as the second intra prediction mode, or another intra prediction mode, or inter prediction mode.

At 2006, the block is encoded using the prediction obtained at 2004 or 2005.

In another variant of FIG. 20A, the determination whether the two intra prediction modes are to be combined is made before determining the second intra prediction mode. For example, the determination can be made based on a size of the block or based on the first intra prediction mode, or other variants described below can be used.

In this other variant, the second intra prediction mode is determined only it is determined that the two intra prediction modes are to be combined.

Figure 20B:
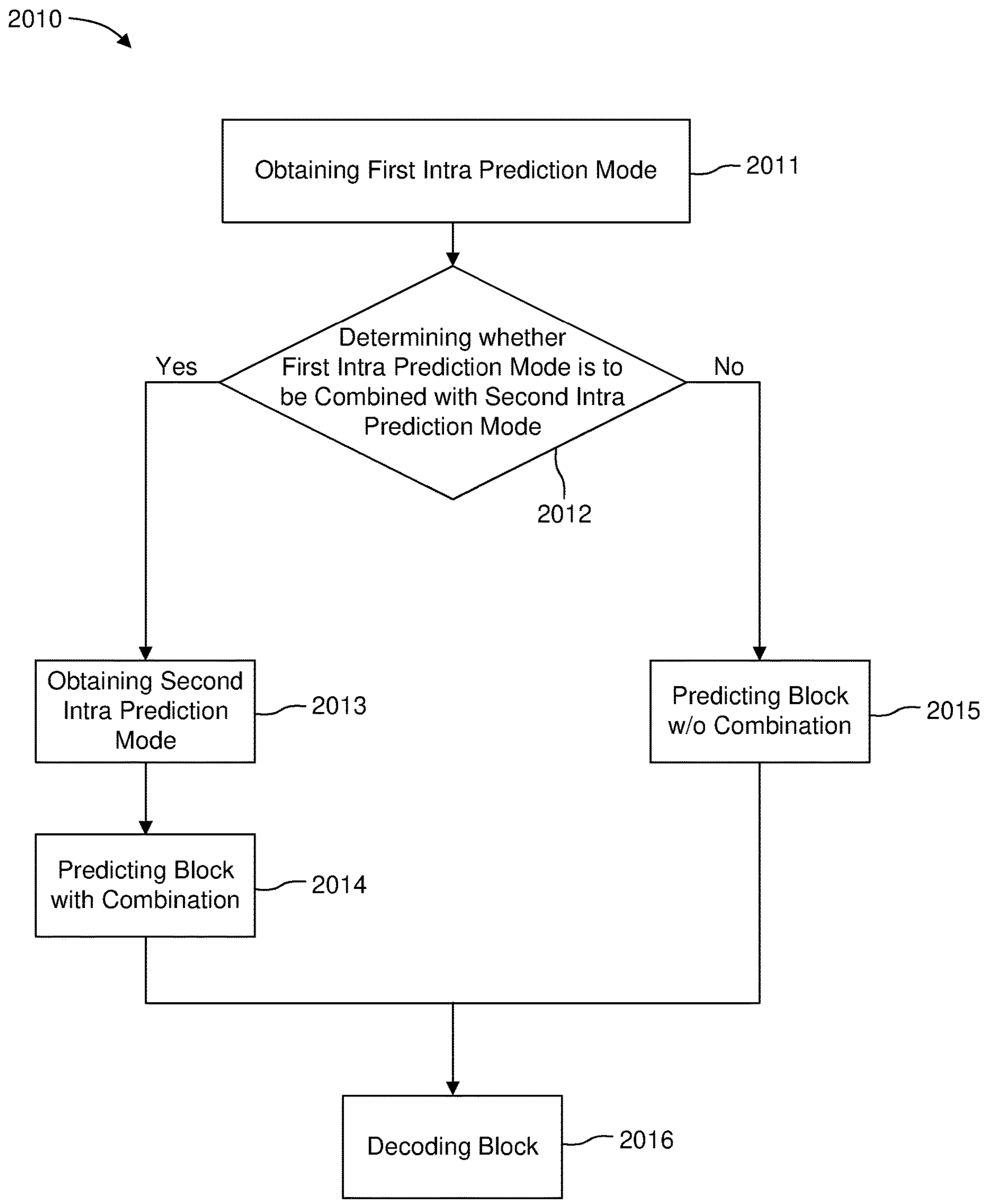
FIG. 20B illustrates an example of a method for decoding a block of an image or a video according to another embodiment.

FIG. 20B illustrates an example of a method 2010 for decoding a block of an image or a video according to another embodiment. At 2011, a first predictor block is obtained from a first intra prediction mode. As an example, the first intra prediction mode can be determined by decoding one or more syntax element from a bitstream indicating the first intra prediction mode.

At 2012, it is determined whether the first intra prediction mode is to be combined or fused with a second intra prediction mode. The determination can be made based on a size of the block or based on the first intra prediction mode, or on or more syntax elements decoded from the bitstream, or based on other variants described below.

If it is determined at 2012 that the first intra prediction mode is to be combined with a second intra prediction mode, then at 2013, the second intra prediction mode is determined and the second predictor block is obtained from the second intra prediction mode. In a variant, the second intra prediction mode can be determined in a same manner as in the embodiment described in relation with FIG. 19B or using any other variants described further below. Then, at 2014, the prediction for the block is obtained by combining the first block predictor and the second block predictor. Embodiments for combining the first block predictor and the second block predictor are described further below.

If it is determined at 2012 that the first intra prediction mode is not to be combined with a second intra prediction, then at 2015, the prediction for the block is obtained without combining the first block predictor and a second block predictor. The prediction for the block can be obtained from the first block predictor or any other prediction, such as a second intra prediction mode, or another intra prediction mode, or inter prediction mode. In any case, the prediction mode for the block is the same as the one used when encoding the block.

At 2016, the block is decoded/reconstructed using the prediction obtained at 2014 or 2015.

Figure 20C:
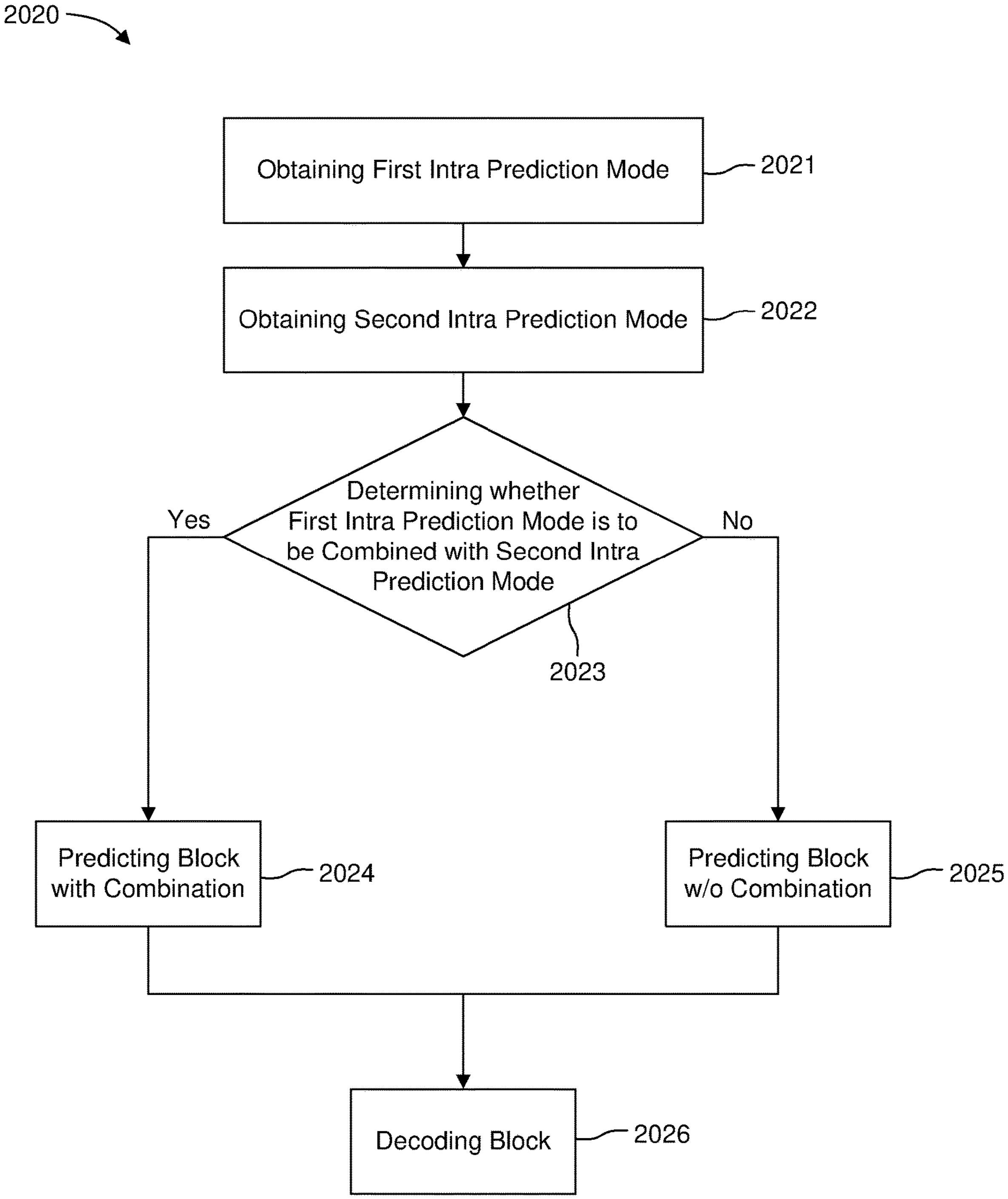
FIG. 20C illustrates an example of a method for decoding a block of an image or a video according to a further embodiment.

FIG. 20C illustrates an example of a method 2020 for decoding a block of an image or a video according to a further embodiment. At 2021, in a similar manner as with FIG. 20B, a first predictor block is obtained from a first intra prediction mode. In this embodiment, the determination at 2023 on whether the two intra prediction modes are to be combined is made after obtaining the second intra prediction mode at 2022. Depending on variants, the second intra prediction mode can be determined by decoding one or more syntax elements providing for the second intra prediction mode or can be derived at the decoder side in a same manner as in the encoder side. Some variants are described further below for determining the second intra prediction mode. The second block predictor is then obtained from the second intra prediction mode that has been determined.

At 2023, it is determined whether the first intra prediction mode is to be combined or fused with the second intra prediction mode. The determination can be made in a same as with FIG. 20A or based on other variants described below.

If it is determined at 2023 that the first intra prediction mode is to be combined with the second intra prediction mode, then at 2024, the prediction for the block is obtained by combining the first block predictor and the second block predictor. Embodiments for combining the first block predictor and the second block predictor are described further below. If it is determined at 2023 that the first intra prediction mode is not to be combined with the second intra prediction, then at 2025, the prediction for the block is obtained without combining the first block predictor and the second block predictor. The prediction for the block can be obtained from the first block predictor or any other prediction, such as a second intra prediction mode, or another intra prediction mode, or inter prediction mode. In any case, the prediction mode for the block is the same as the one used when encoding the block.

At 2026, the block is decoded/reconstructed using the prediction obtained at 2024 or 2025.

Some embodiments for determining the second intra prediction mode are described below. In some embodiments, the second intra prediction mode is a directional intra prediction mode. In some embodiments, the directional intra prediction mode to be combined is derived from decoder-based process(es), namely Decoder-side Intra Mode Derivation (DIMD) or Template-based Intra Mode Derivation (TIMD), to avoid having to signal an IPM index for the second intra prediction mode. In the following, it is assumed that the directional intra prediction mode to be combined is derived from decoder-based process(es).

In a variant wherein the first prediction mode is determined to be a Planar mode, the following variants can be used for deriving the second intra prediction mode.

Classically, the DIMD process combines two IPMs with the Planar mode. Therefore, in an embodiment where DIMD is used to derive the second intra prediction mode (directional modes), the combination of the two intra prediction modes (also named luma intra fusion in the following) may not be applied to luma CBs that use the Planar mode.

In an embodiment where TIMD is used to derive the second intra prediction mode (additional directional intra prediction mode), the Planar mode may be removed from the TIMD search.

In an embodiment, the second intra prediction mode can be determined as the second MPM of the list (MPM[1]). Thus, in this embodiment, the first and second MPMs from the MPM list (MPM[0] and MPM[1]) are combined, as Planar is MPM[0] and MPM[1] is often a direction-based mode. In a variant, such a combination of the first and second MPMs of the MPM list is done only under certain conditions. For example, this can be done when the left and above neighbors are close: i.e. left and above use the same IPM or left and above indices have an absolute difference of 1.

In a variant wherein the first prediction mode is determined to be a DC mode, the following variants can be used for deriving the second intra prediction mode.

In an embodiment where TIMD is used to derive the second intra prediction mode (additional directional intra prediction mode), DC may be removed from the TIMD search.

In a variant wherein the first prediction mode is determined to be a MIP mode, the following variants can be used for deriving the second intra prediction mode or for adapting the MIP mode. As described above, the MIP mode uses a matrix from among a set of trained matrices for generating the prediction for the block. To efficiently apply a direction-based IPM (second intra prediction mode) on top of a MIP mode (used as a first intra prediction mode), the matrices used in the MIP mode can be retrained to not capture the direction of the block. This means that the retrained matrices would only predict non-directional information in the block, leaving the directional information to be predicted from the luma intra fusion mode combining the first and second intra prediction modes.

In another embodiment, only a subset (e.g. half) of the matrices are retrained to not predict the direction(s), while the others are retrained in the same way as described above in relation with the classical MIP mode.

In those embodiments, only matrices which have been trained to not predict directional information could be selected in the MIP mode when the MIP mode is used as first intra prediction mode of the combination of the two intra prediction modes (luma intra fusion).

In a variant, the combination of the two intra prediction modes (luma intra fusion) is always applied on the retrained matrices, in this way no additional signaling is needed. Indeed, "no additional signaling is needed" because (1) as a decoder-based process derives the index of the directional intra prediction mode (second intra prediction mode), the identification of the directional intra prediction mode involved in the luma intra fusion incurs no signaling cost, (2) as the luma intra fusion always applies to a MIP mode (first intra prediction mode), there is no need for the luma intra fusion to be signaled.

In a variant wherein the first prediction mode is determined to be an IBC mode, the following variants can be used for deriving the second intra prediction mode.

In an embodiment, in the case of using luma intra fusion on a luma CB using IBC as a first intra prediction mode, the second intra prediction mode uses the intra mode which was used by the original luma CB that is pointed by the IBC motion vector.

In an embodiment, the application of luma intra fusion is limited to the case where the block pointed by the IBC motion vector used is a regular intra coded block using a directional IPM.

In an embodiment, luma intra fusion is also applied when the block pointed was not coded using regular intra but the propagated intra information is a directional mode.

Depending on the embodiments used for the luma intra fusion, i.e. combining first and second intra prediction modes, one or more syntax elements are signaled in the bitstream along with coded data representative of the block. The one or more syntax elements can signaled one or more of the following item: the first intra prediction mode, the second intra prediction mode, an indicator indicating whether the first intra prediction mode is to be combined with the second intra prediction mode, an indicator indicating whether the second intra prediction mode is obtained from a decoder side intra mode derivation or a template based intra mode derivation, an indicator indicating a weight from among a set of weights to use for the first predictor block when combining the first and second predictor blocks.

Figure 21A:
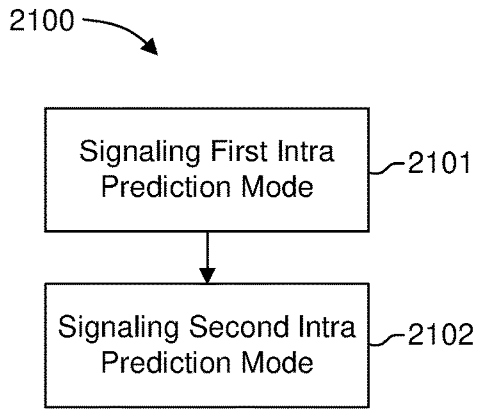
FIG. 21A illustrates an example of a method for signaling or decoding one or more syntax elements in or from a bitstream, the one or more syntax element providing for determining one or more intra prediction modes used for predicting a block of an image or a video according to an embodiment.
Figure 21B:
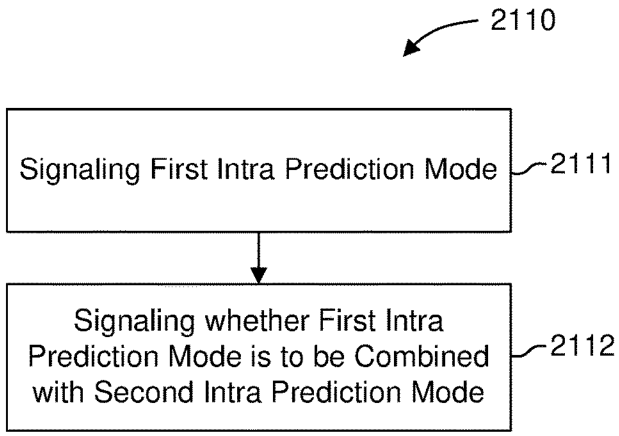
FIG. 21B illustrates an example of a method for signaling or decoding one or more syntax elements in or from a bitstream, the one or more syntax element providing for determining one or more intra prediction modes used for predicting a block of an image or a video according to another embodiment.

Some embodiments for signaling the one or more syntax elements are described. FIG. 21A illustrates an example of a method 2100 for signaling in a bitstream or decoding from a bitstream one or more syntax elements providing for determining one or more intra prediction modes used for predicting a block of an image or a video according to an embodiment. For instance, method 2100 can be combined with embodiments described in relation with FIGS. 19A and 19B. It is assumed here the block is coded using a prediction combining a first intra prediction mode and a second prediction mode as explained in any one of the embodiments described herein. At 2101, one or more syntax element are encoded in, respectively decoded from a bitstream, indicating the first intra prediction mode. At 2102, one or more syntax element are encoded in, respectively decoded from a bitstream, indicating the second intra prediction mode. FIG. 21B illustrates an example of a method 2110 for signaling or decoding one or more syntax elements in or from a bitstream, the one or more syntax element providing for determining one or more intra prediction modes used for predicting a block of an image or a video according to another embodiment. For instance, method 2110 can be combined with embodiments described in relation with FIG. 20A-20B-20C. It is assumed here the block is coded using a prediction combining a first intra prediction mode and a second prediction mode as explained in any one of the embodiments described herein. At 2111, one or more syntax element are encoded in, respectively decoded from a bitstream, indicating the first intra prediction mode. At 2112, one or more syntax element are encoded in, respectively decoded from a bitstream, indicating whether the first intra prediction mode is to be combined with the second intra prediction mode. In other words, it is signaled here whether the luma intra fusion mode is used for the block. In a variant, the second intra prediction mode is not signaled in the bitstream. Therefore, if the first intra prediction mode is to be combined with a second intra prediction mode, the second intra prediction mode is derived at the decoder in a same manner as in the encoder. In another variant, one or more syntax element can be signaled for indicating the second intra prediction mode.

Figure 21C:
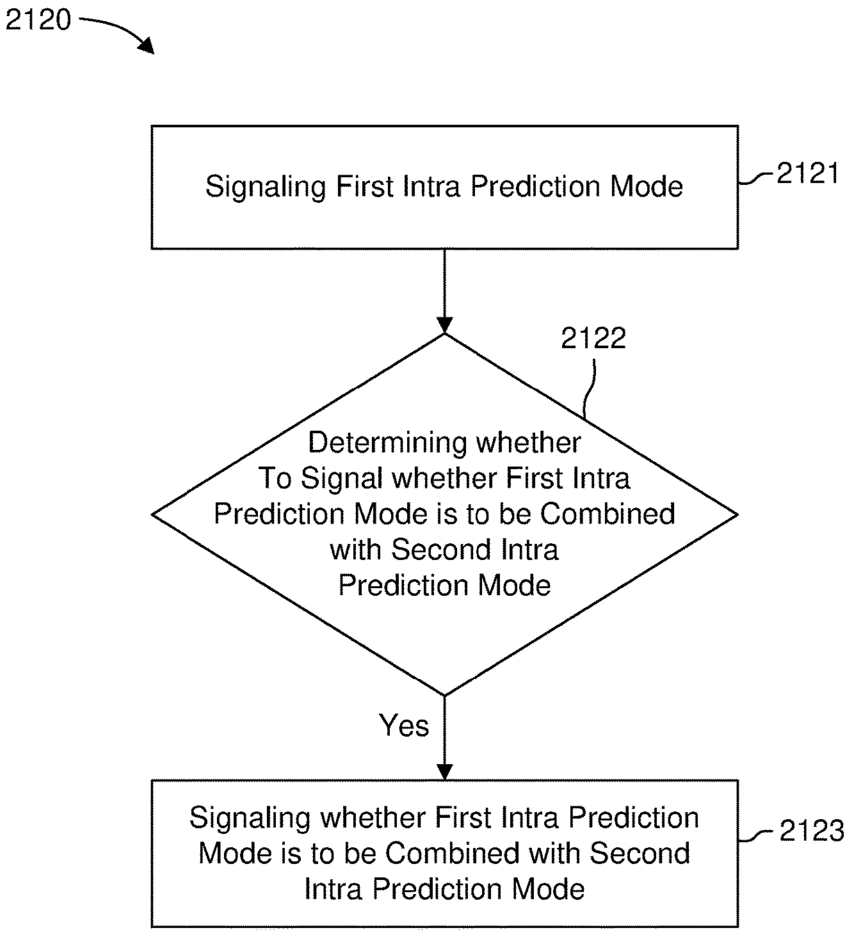
FIG. 21C illustrates an example of a method for signaling or decoding one or more syntax elements in or from a bitstream, the one or more syntax element providing for determining one or more intra prediction modes used for predicting a block of an image or a video according to another embodiment.

FIG. 21C illustrates an example of a method 2120 for signaling or decoding one or more syntax elements in or from a bitstream, the one or more syntax element providing for determining one or more intra prediction modes used for predicting a block of an image or a video according to another embodiment. For instance, method 2120 can be combined with embodiments described in relation with FIG. 19A-19B or FIG. 20A-20B-20C. It is assumed here the block is coded using a prediction combining a first intra prediction mode and a second prediction mode as explained in any one of the embodiments described herein. At 2121, one or more syntax element are encoded in, respectively decoded from a bitstream, indicating the first intra prediction mode. At 2122, it is determined whether the use of the luma intra fusion mode is signaled in the bitstream or not. In other words, it is determined whether it is signaled in the bitstream whether the first intra prediction mode is to be combined with the second intra prediction. As described in some embodiments above, the use of the combination of the first and second intra prediction modes can be disabled or enabled based on the size of the block, or on the first intra prediction mode. In another variant, the use of the combination of the first and second intra prediction modes can be disabled or enabled based on a cost evaluated when determining the second intra prediction mode, for instance using the TIMD search. This determination of whether the use of the combination is signaled in the bitstream is done in a same manner at the encoder and the decoder. If it is determined that the use of the combination of the first and second intra prediction modes is disabled, then it is not necessary to signal whether the combination is used or not, since the same determination is performed on both the encoder and the decoder.

If it is determined that the combination of the first and second intra prediction modes (use of luma intra fusion) is to be signaled, then the use of the combination of the first and second intra prediction modes is signaled to indicate whether the block is effectively predicted by the combined prediction of the first and second intra prediction modes or by another prediction. Then at 2123, one or more syntax element are encoded in, respectively decoded from a bitstream, the on ore more syntax elements indicating whether the first intra prediction mode is to be combined with the second intra prediction mode. In other words, it is signaled here whether the luma intra fusion mode is used for the block. The same variant for signaling or deriving the second intra prediction described above are also possible.

Figure 21D:
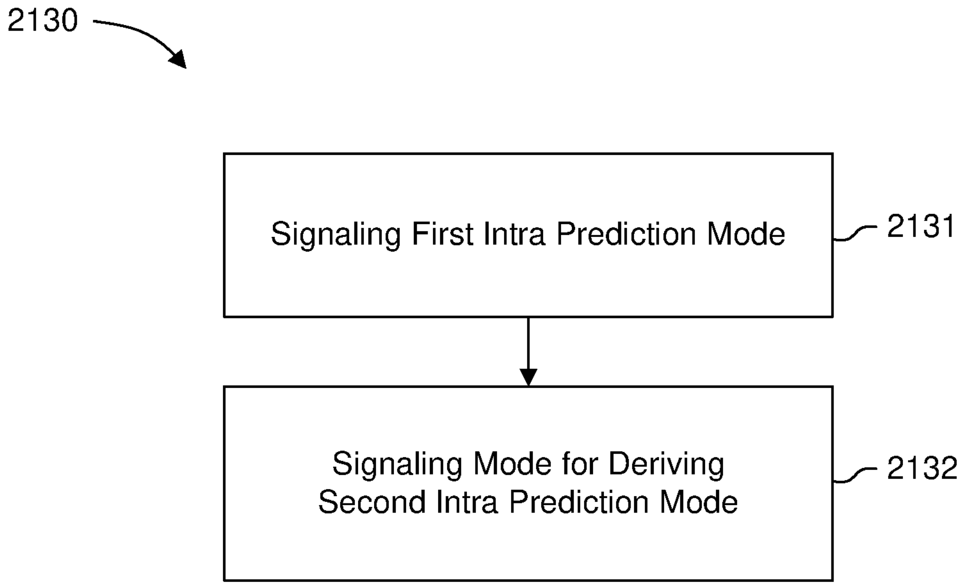
FIG. 21D illustrates an example of a method for signaling or decoding one or more syntax elements in or from a bitstream, the one or more syntax element providing for determining one or more intra prediction modes used for predicting a block of an image or a video according to another embodiment.

FIG. 21D illustrates an example of a method 2130 for signaling or decoding one or more syntax elements in or from a bitstream, the one or more syntax element providing for determining one or more intra prediction modes used for predicting a block of an image or a video according to another embodiment. For instance, method 2130 can be combined with embodiments described in relation with FIG. 19A-19B or FIG. 20A-20B-20C. It is assumed here the block is coded using a prediction combining a first intra prediction mode and a second prediction mode as explained in any one of the embodiments described herein. At 2131, one or more syntax elements are encoded in, respectively decoded from a bitstream, indicating the first intra prediction mode. At 2132, one or more syntax elements are encoded in the bitstream, respectively decoded from the bitstream, indicating a mode for deriving the second intra prediction mode. For instance, the one or more syntax elements indicate whether DIMD or TIMD is used for deriving the second intra prediction mode. This embodiment can be combined with embodiments described in relation with FIG. 21A-21B-21C.

Figure 21E:
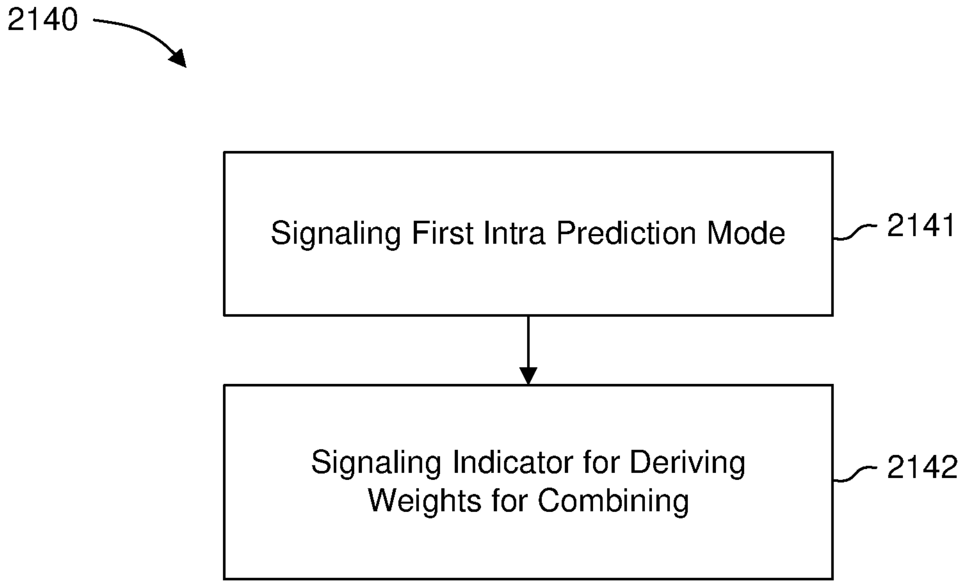
FIG. 21E illustrates an example of a method for signaling or decoding one or more syntax elements in or from a bitstream, the one or more syntax element providing for determining one or more intra prediction modes used for predicting a block of an image or a video according to another embodiment.

FIG. 21E illustrates an example of a method 2140 for signaling or decoding one or more syntax elements in or from a bitstream, the one or more syntax element providing for determining one or more intra prediction modes used for predicting a block of an image or a video according to another embodiment. For instance, method 2140 can be combined with embodiments described in relation with FIG. 19A-19B or FIG. 20A-20B-20C. It is assumed here the block is coded using a prediction combining a first intra prediction mode and a second prediction mode as explained in any one of the embodiments described herein. At 2141, one or more syntax elements are encoded in, respectively decoded from a bitstream, indicating the first intra prediction mode. At 2142, one or more syntax elements are encoded in the bitstream, respectively decoded from the bitstream, the one or more syntax elements providing for deriving weights for combining the first and second intra prediction modes, as is described further below. This embodiment can be combined with embodiments described in relation with FIG. 21A-21B-21C-21D.

In the embodiments described above, the first intra prediction mode is signaled to the decoder using one or more syntax elements. However, in some embodiments, the first intra prediction mode is not explicitly signaled to the decoder. For instance, one or more syntax elements can be used to signal the use of the luma intra fusion for the block wherein the first intra prediction mode and the second intra prediction mode are derived at the decoder. For instance, the combination of the first and second intra prediction modes is known to the decoder.

In another embodiment, only the first intra prediction mode is signaled to the decoder, and the use of the combination of the first and second intra prediction modes is always activated. The second intra prediction mode being determined based on the first intra prediction mode or derived from a DIMD or TIMD process.

Further embodiments relating to the signaling are described below, that can be combined with the embodiments described above.

In some embodiments, an SPS flag is used to indicate whether the use of the luma intra fusion may be used on the slice or not. In the embodiments where TIMD (resp. DIMD) is used to derive the second intra prediction mode of the luma intra fusion, this flag is not transmitted and inferred to be 0 when TIMD (resp. DIMD) is not enabled.

In some embodiments, the use of the luma intra fusion is limited to certain block sizes. Specifically, the luma intra fusion can be disallowed on blocks that are too small (e.g. if their width times their height is smaller than 32, or if their width or height is below a certain value, e.g. 8) to reduce latency issues for smaller blocks. Additionally, in some embodiments, the luma intra fusion can be disallowed on blocks considered too big, for better performance (e.g. if their width times their height is larger than 1024 or if their width or height is above a certain value, e.g. 32).

In another embodiment, called "Embodiment signaling per block", when allowed in the slice and on the block, the luma intra fusion process is always signaled on a block if the intra prediction mode selected to predict this block can be the first intra prediction mode of the luma intra fusion, i.e. one of the non-directional intra modes mentioned above such as regular intra Planar, MIP, IBC.

Figure 22:
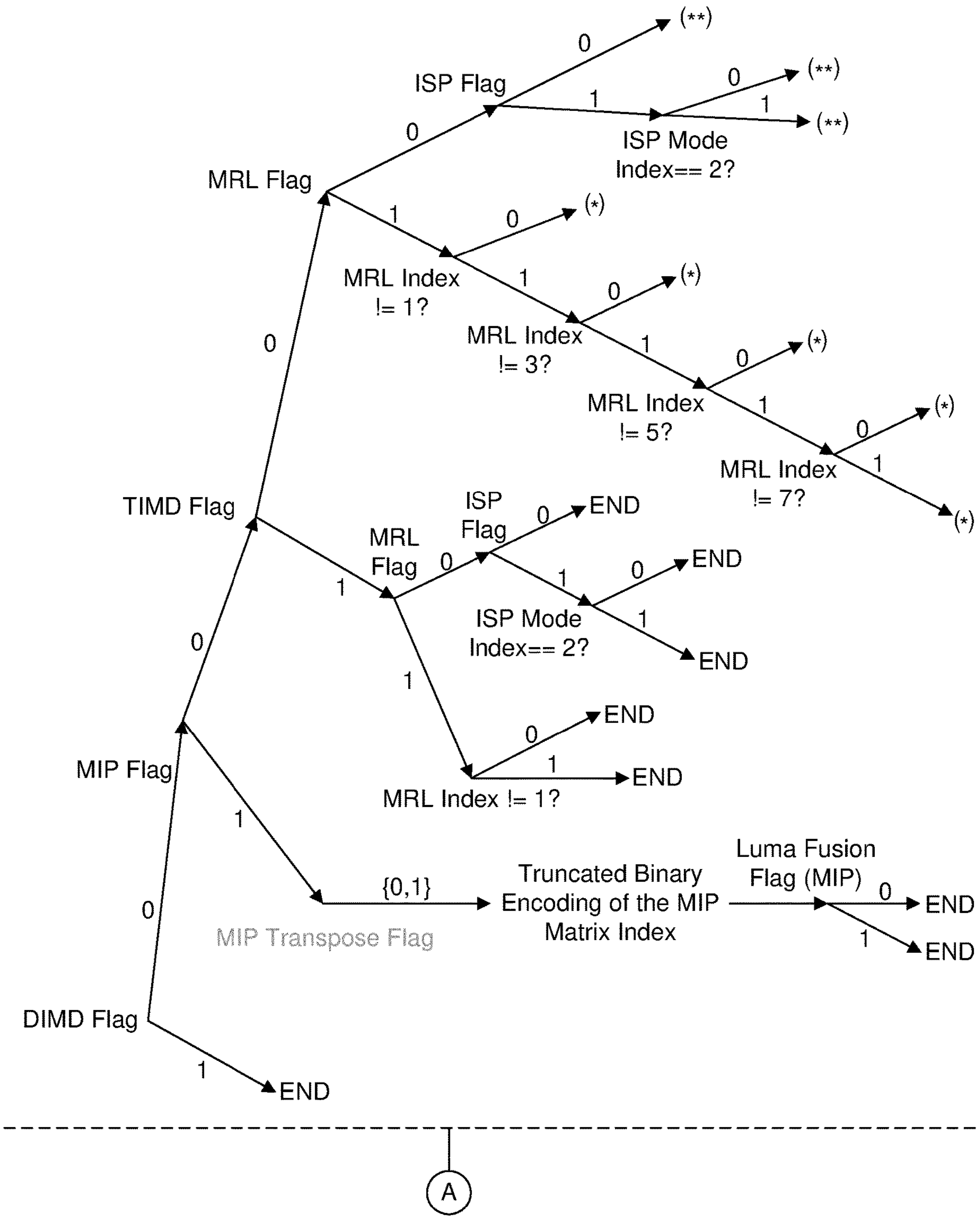
FIG. 22 illustrates an example of a method for signaling or decoding one or more syntax elements in or from a bitstream, the one or more syntax element providing for determining one or more intra prediction modes used for predicting a block of an image or a video according to another embodiment.
Figure 22:
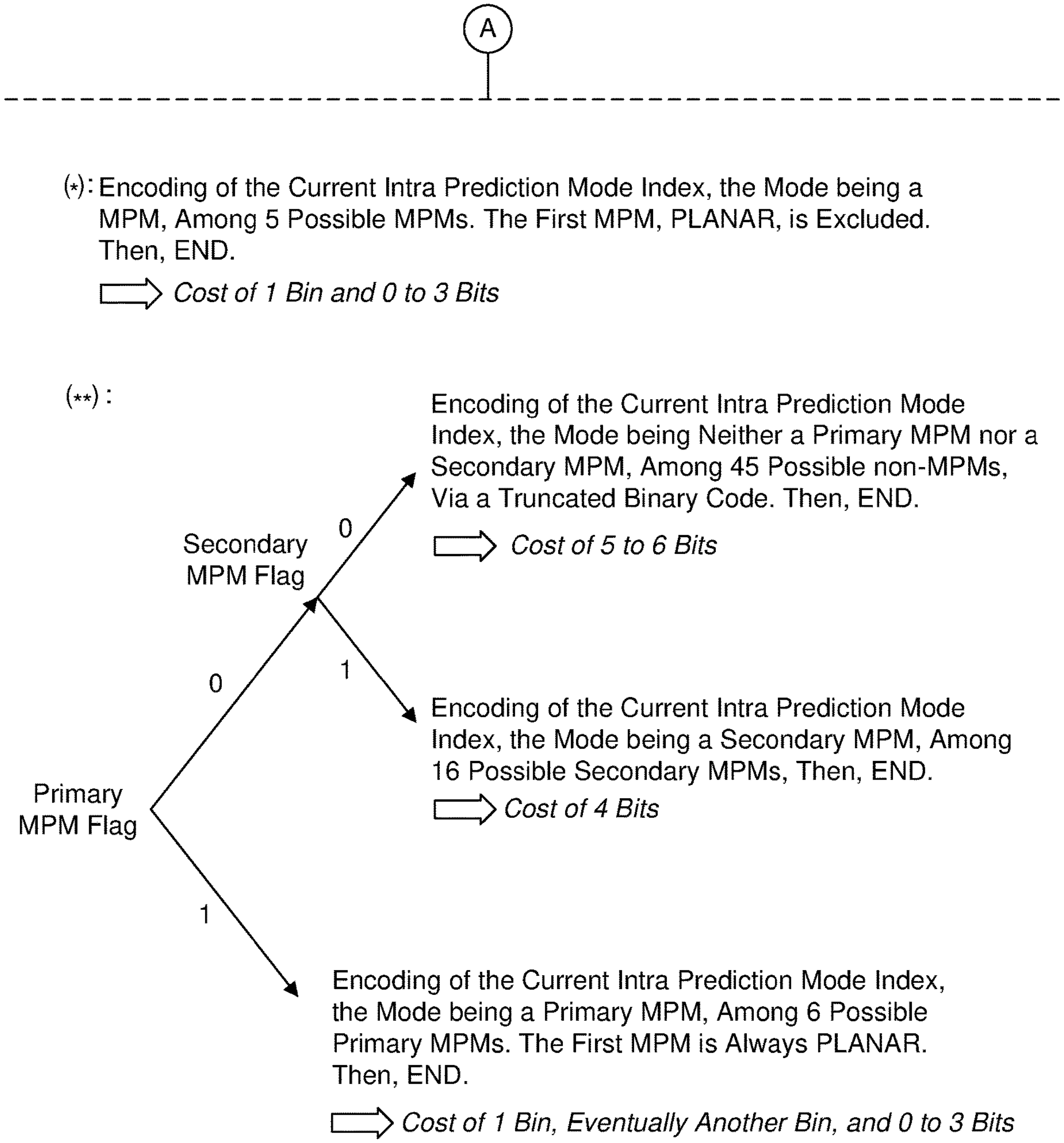

For instance, applying "Embodiment signaling per block" when the luma intra fusion process is always signaled on a block if the intra prediction mode selected to predict this block is a MIP mode. FIG. 22 shows an example of an updated signaling of the intra prediction mode selected to predict the current luma CB in ECM-4.0. Note that, given the legend of FIG. 22, the luma intra fusion flag (MIP) is coded with CABAC context model(s). But, FIG. 22 is an example. The luma intra fusion flag (MIP) may be bypass coded. Note also that, in FIG. 22, the luma intra fusion flag (MIP) is placed after the truncated binary encoding of the MIP matrix index. Yet, the luma intra fusion flag (MIP) may be placed between the MIP transpose flag and the truncated binary encoding of the MIP matrix index. The luma intra fusion flag (MIP) may also be placed between the MIP flag and the MIP transpose flag. In FIG. 22, for instance, TIMD is systematically used as decoder-based process to derive the index of the second intra prediction mode, e.g. directional intra prediction mode, involved in the luma intra fusion.

Figure 23A:
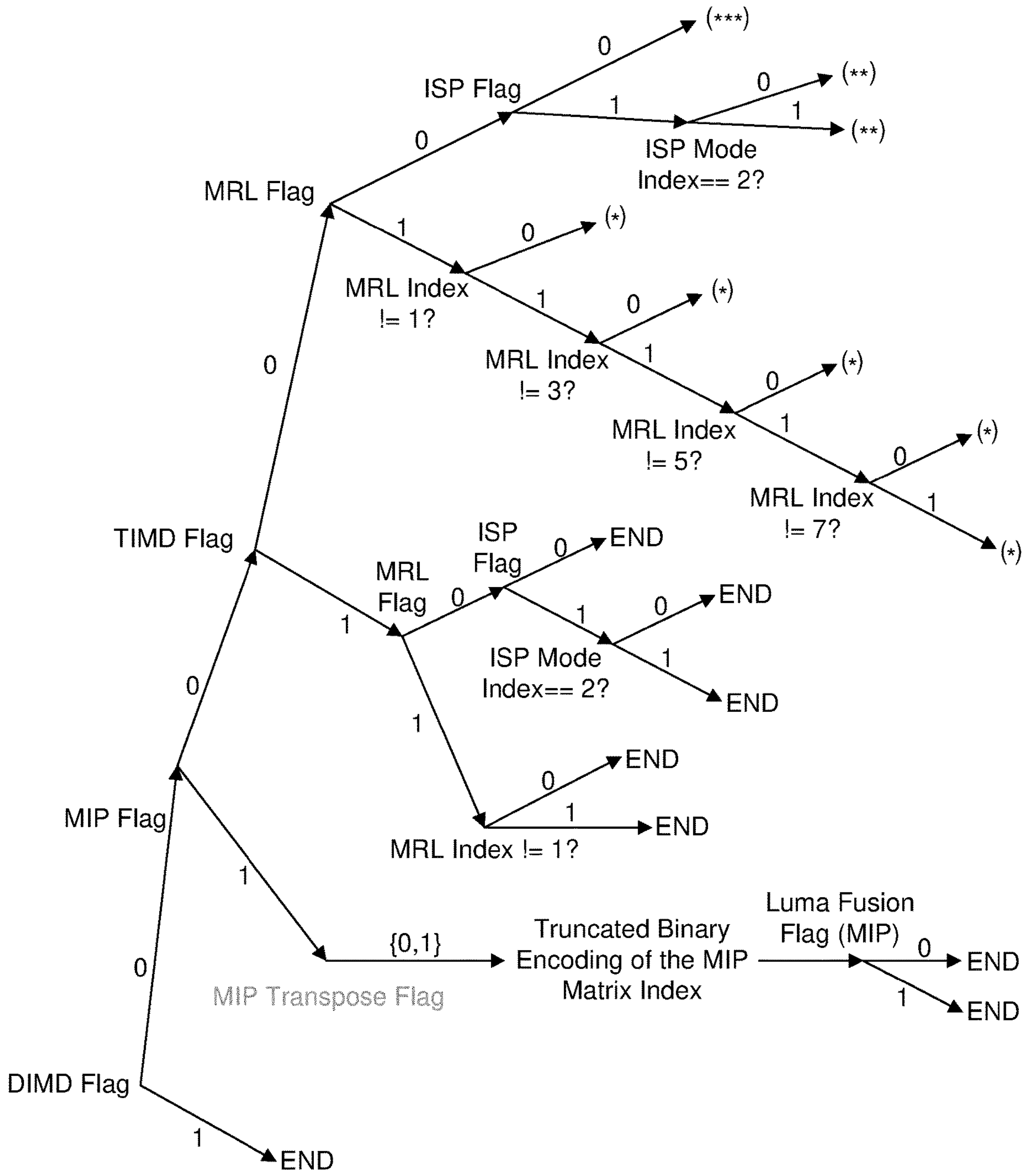
FIGS. 23A and 23B illustrate an example of a method for signaling or decoding one or more syntax elements in or from a bitstream, the one or more syntax element providing for determining one or more intra prediction modes used for predicting a block of an image or a video according to another embodiment.
Figure 23B:
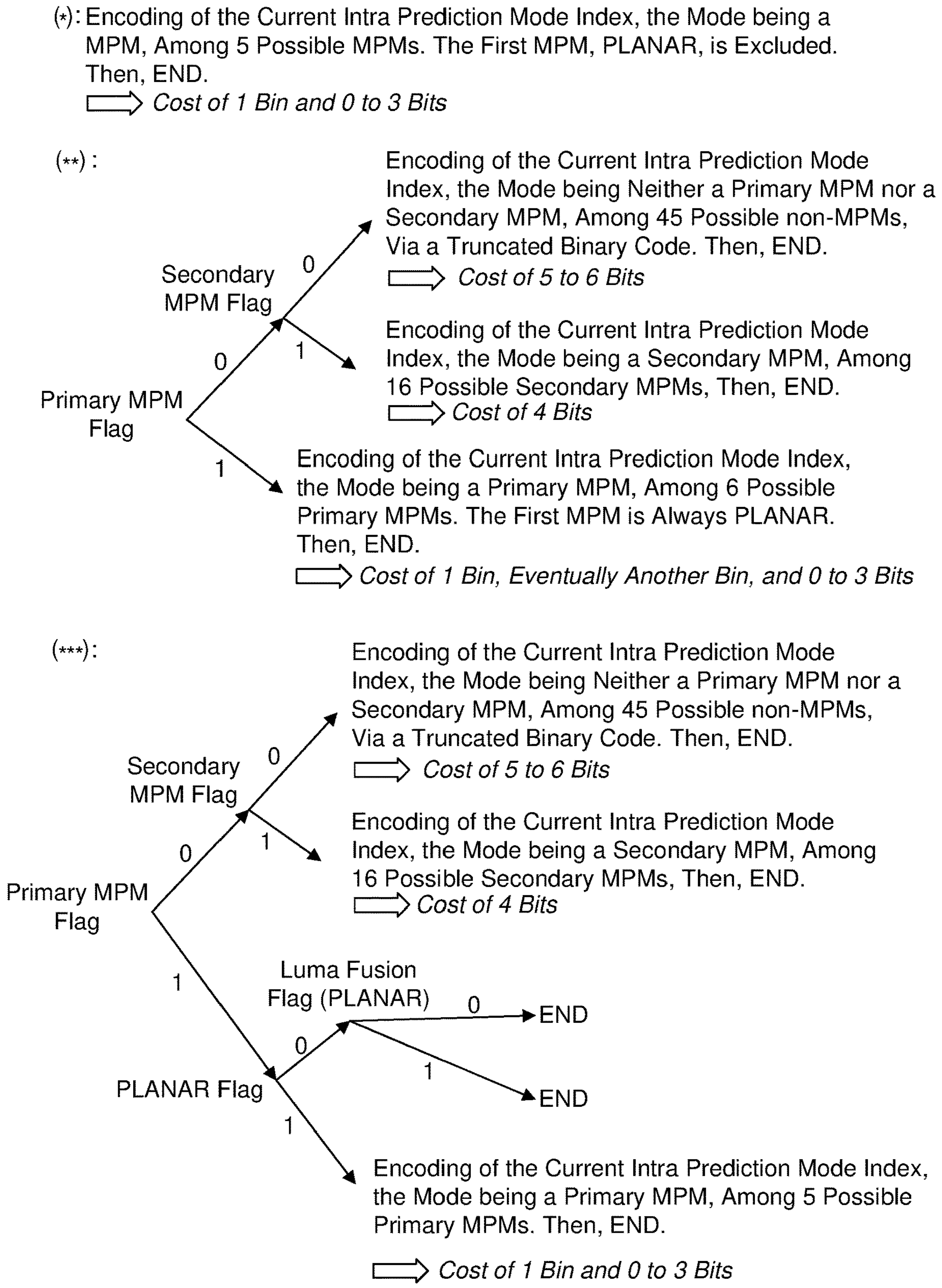

As another example, applying "Embodiment signaling per block" when the luma intra fusion process is always signaled on a block if the intra mode selected to predict this block is either a MIP mode or the Planar mode, FIGS. 23A and 23B show an example of the updated signaling of the intra prediction mode selected to predict the current luma CB in ECM-4.0. Note that, given the legend of FIGS. 23A and 23B, the luma intra fusion flag (PLANAR) is coded with CABAC context model(s). But, the luma intra fusion flag (PLANAR) may be bypass coded. In FIGS. 23A and 23B, for instance, TIMD is systematically used as decoder-based process to derive the index of the second intra prediction mode, e.g. directional intra prediction mode, involved in the luma intra fusion.

FIGS. 23A and 23B illustrates the signaling of the intra prediction mode selected to predict the current luma CB in ECM-4.0 in the case of "Embodiment signaling per block" when the luma intra fusion process is always signaled on a block if the intra mode selected to predict this block is either a MIP mode or the Planar mode. Note that, here, if ISP is selected for predicting the current block or luma CB, i.e. ISP flag at 1, the luma intra fusion flag (PLANAR) is not signaled and inferred to 0. Note also that, if MRL is selected for predicting the current block, the Planar mode cannot be the intra prediction mode selected for predicting the current block, thus inferring the luma intra fusion flag (PLANAR) to 0.

In some embodiments, the luma intra fusion process is always applied, without additional signaling. In some embodiments, the process is always applied and not signaled for specific cases. For example, in the embodiments where the MIP matrices have a retrained subset specifically for the luma intra fusion, the luma intra fusion process is always applied on blocks which use matrices from the retrained subset.

In some embodiments both TIMD and DIMD can be used to derive the directional intra prediction mode. In those embodiments a flag can be used to indicate which derivation process should be used.

In some embodiments, there is no decoder-side derivation process, and the directional mode used for luma intra fusion is signaled to the decoder.

In some embodiments, when a block to be coded is eligible for luma intra fusion, a cost evaluation, such as, for example, the TIMD process is always applied and the luma intra fusion is performed if and only if the SATD cost obtained by this evaluation is below a certain threshold. In some embodiments, this threshold is used to determine whether the luma intra fusion process should be transmitted: e.g. if the SATD cost is above a threshold, the luma intra fusion is never applied, otherwise it is signaled whether to use it or not; or if the SATD cost is below a threshold it is always applied, otherwise it is signaled whether it is applied or not.

In the following, some embodiments are described for determining weights used when combining the first and second intra prediction modes in the luma intra fusion mode.

Let's call predA the first predictor block resulting from the prediction with the first intra prediction mode of the luma intra fusion mode, before applying luma intra fusion (i.e. the prediction resulting from regular Planar, MIP, IBC or other modes eligible for luma intra fusion), and predB the second predictor block resulting from the prediction with the second intra prediction mode, e.g. directional mode selected for the luma intra fusion (i.e. the prediction from the intra mode selected by, for example, the TIMD or DIMD process). The final prediction block resulting from the luma intra fusion is called predF with $$predF[x][y] = \alpha[x][y] \times predA[x][y] + \beta[x][y] \times predB[x][y]$$

Such that $\alpha+\beta=1$.

In some embodiments, $\alpha$ and $\beta$ have fixed values in the whole block. For example, in some embodiments $\alpha=\beta=0.5$ for all samples, or, in some other embodiments $\alpha=0.75$ and $\beta=0.25$. In some embodiments, the weights used depend on the first intra prediction mode used for luma intra fusion. For example, in some embodiments, if luma intra fusion is used on top of MIP the weights are $\alpha=\beta=0.5$ but are $\alpha=0.75$ and $\beta=0.25$ otherwise.

In some embodiments, a set of weights exists, and the selected weight is transmitted to the decoder after signaling that luma intra fusion is used on a block. For example, a set of weights for a can be {¼, ½, ¾}(with $\beta=1-\alpha$). In some embodiments the weights differ depending on the first intra prediction mode used for luma intra fusion. For example, the weights for a when using luma intra fusion on top of MIP can be {¼, ½, ¾} but {⅜, ½, ⅝} when used on top of IBC.

In some embodiments, a similar process as the one used for determining whether the luma intra fusion should be transmitted can be applied to determine the weights to use. For example, if cost evaluation of the additional mode (e.g. the SATD given by the TIMD derivation process) is below a certain threshold the weights can be, for example, $\alpha=0.75$ and $\beta=0.25$ and be $\alpha=\beta=0.5$ otherwise. Similarly, in some embodiments, if the SATD cost is above a certain threshold, the weights can be, for example, $\alpha=0.25$ and $\beta=0.75$ and be $\alpha=\beta=0.5$ otherwise.

In some embodiments the weights for luma intra fusion may be derived for each block. For example, in some embodiments using TIMD for luma intra fusion, the SATD cost costA of the first intra prediction mode may be computed on the TIMD template. With costB being the cost of the best direction-based mode found by TIMD, the final weights may be derived as $$\alpha = costA/(costA + costB) \text{ and } \beta = 1 - \alpha$$

In some embodiments the weights can vary inside the block. For example, for each sample of position (x, y), with (0, 0) being the top left corner and (width, height) being the bottom right corner, the weights can be $$\alpha[x][y] = 0.75, \text{ when } x < \frac{\text{width}}{4} \text{ or } y < \frac{\text{height}}{4}$$

$$\alpha[x][y] = 0.5 \text{ otherwise}$$

$$\beta[x][y] = 1 - \alpha[x][y]$$

In some embodiments, the weights may depend on the rank r in the MPM list of the second intra prediction mode (direction-based IPM). For example, in some embodiments, when the direction-based mode selected by TIMD is within the first N modes of the MPM list, α may be computed as $$\alpha = \frac{N - r}{M},$$

with N<M and β=1−α. In some embodiments N=8 and M=16.

The embodiments described herein provide a new image or video compression tool that combine the prediction of two intra prediction modes. In some embodiments, the tool is used by combining a non-directional intra tool, such as the Planar mode, the Matrix-based Intra Prediction (MIP) or the Intra Block Copy (IBC) with a directional Intra Prediction Mode (IPM). To reduce the signaling cost, the direction-based mode could be derived at the decoder using tools like Template-based Intra Mode Derivation (TIMD) or Decoder-side Intra Mode Derivation (DIMD).

Figure 24:
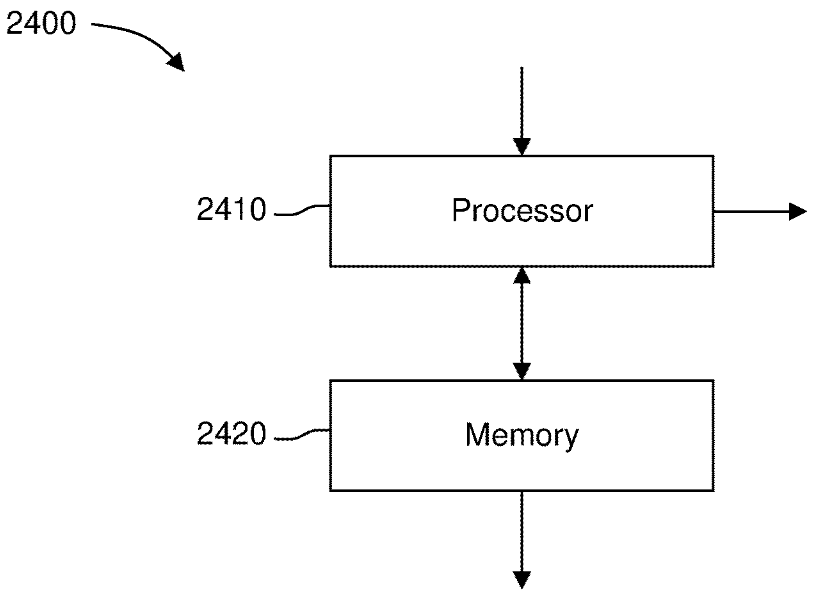
FIG. 24 illustrates a block diagram of a system within which aspects of the present embodiments may be implemented, according to another embodiment.

FIG. 24 illustrates a block diagram of a system within which aspects of the present embodiments may be implemented, according to another embodiment. FIG. 24 shows one embodiment of an apparatus 2400 for encoding or decoding a block of an image or a video wherein the block is predicted using a luma fusion mode as described according to any one of the embodiments described herein. The apparatus comprises Processor 2410 and can be interconnected to a memory 2420 through at least one port. Both Processor 2410 and memory 2420 can also have one or more additional interconnections to external connections.

Processor 2420 is also configured to obtain a first intra prediction mode, obtain a second intra prediction mode, and encode or decode the at least one block based on a combination of the first intra prediction mode and the second intra prediction mode, using any one of the embodiments described herein. For instance, the processor 2421 is configured using a computer program product comprising code instructions that implements any one of embodiments described herein.

Figure 25:
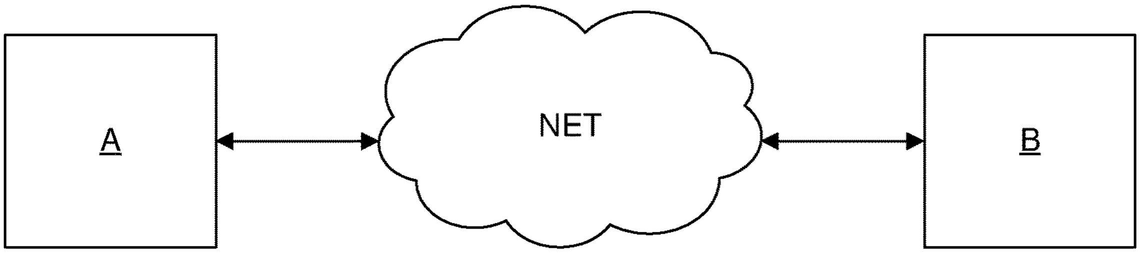
FIG. 25 shows two remote devices communicating over a communication network in accordance with an example of the present principles.

In an embodiment, illustrated in FIG. 25, in a transmission context between two remote devices A and B over a communication network NET, the device A comprises a processor in relation with memory RAM and ROM which are configured to implement a method for encoding a block of an image or a video, as described with FIGS. 1, 2, 19A, 20A, 21A-E and the device B comprises a processor in relation with memory RAM and ROM which are configured to implement a method for decoding a block of an image or a video as described in relation with FIGS. 1, 3, 19B, 20B, 20C, 21A-E. Depending on embodiments, the devices A and B are also configured for predicting the block using the luma fusion mode as described in relation with FIGS. 4-23B.

In accordance with an example, the network is a broadcast network, adapted to broadcast/transmit encoded image or video from device A to decoding devices including the device B.

Figure 26:
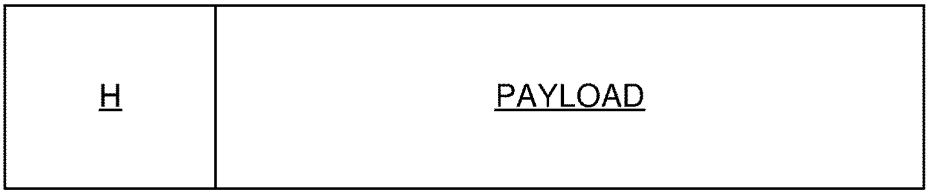
FIG. 26 shows the syntax of a signal in accordance with an example of the present principles.

FIG. 26 shows an example of the syntax of a signal transmitted over a packet-based transmission protocol. Each transmitted packet P comprises a header H and a payload PAYLOAD. In some embodiments, the payload PAYLOAD may comprise coded image or video data according to any one of the embodiments described above. In a variant, the signal comprises data representative of any one of the following items:

The first intra prediction mode,

The second intra prediction mode, an indicator indicating whether the second intra prediction mode is obtained from a decoder side intra mode derivation or a template based intra mode derivation is signaled in a bitstream.

an indicator indicating whether the first intra prediction mode is to be combined with the second intra prediction mode is signaled for the at least one block in a bitstream, an indicator indicating the use of the luma fusion mode for the block, an indicator indicating a matrix to be used by the first intra prediction mode, the first intra prediction mode being a MIP mode used in the luma fusion mode, an indicator indicating a weight from among a set of weights to use for a prediction obtained from the first intra prediction mode in the luma fusion mode.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, decode re-sampling filter coefficients, re-sampling a decoded picture.

As further examples, in one embodiment "decoding" refers only to entropy decoding, in another embodiment "decoding" refers only to differential decoding, and in another embodiment "decoding" refers to a combination of entropy decoding and differential decoding, and in another embodiment "decoding" refers to the whole reconstructing picture process including entropy decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream.

In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, determining re-sampling filter coefficients, re-sampling a decoded picture.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, are descriptive terms. As such, they do not preclude the use of other syntax element names.

This disclosure has described various pieces of information, such as for example syntax, that can be transmitted or stored, for example. This information can be packaged or arranged in a variety of manners, including for example manners common in video standards such as putting the information into an SPS, a PPS, a NAL unit, a header (for example, a NAL unit header, or a slice header), or an SEI message. Other manners are also available, including for example manners common for system level or application level standards such as putting the information into one or more of the following:

a. SDP (session description protocol), a format for describing multimedia communication sessions for the purposes of session announcement and session invitation, for example as described in RFCs and used in conjunction with RTP (Real-time Transport Protocol) transmission.
b. DASH MPD (Media Presentation Description) Descriptors, for example as used in DASH and transmitted over HTTP, a Descriptor is associated to a Representation or collection of Representations to provide additional characteristic to the content Representation.
c. RTP header extensions, for example as used during RTP streaming.
d. ISO Base Media File Format, for example as used in OMAF and using boxes which are object-oriented building blocks defined by a unique type identifier and length also known as 'atoms' in some specifications.
e. HLS (HTTP live Streaming) manifest transmitted over HTTP. A manifest can be associated, for example, to a version or collection of versions of a content to provide characteristics of the version or collection of versions.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Some embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options.

Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory. Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information. It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

A number of embodiments has been described above. Features of these embodiments can be provided alone or in any combination, across various claim categories and types.

The invention claimed is:

1. A method, comprising, for at least one block of an image or a video:

decoding an indicator indicating a first intra prediction mode, wherein the first intra prediction mode is one of an intra block copy prediction mode or a matrix-based intra prediction mode, determining whether the first intra prediction mode is to be combined with a second intra prediction mode for obtaining a prediction of the at least one block, responsive to determining that the first intra prediction mode is to be combined with a second intra prediction mode, obtaining the second intra prediction mode, and decoding the at least one block based on a combination of the first intra prediction mode and the second intra prediction mode.

2. The method of claim 1, wherein one of the first intra prediction mode or the second intra prediction mode is obtained from among a set of non-directional intra prediction modes, and the other of the first intra prediction mode and the second intra prediction mode is obtained from among a set of directional intra prediction modes.

3. The method of claim 1, wherein at least one of the first intra prediction mode or the second intra prediction mode is signaled in a bitstream.

4. The method of claim 3, wherein an indicator indicating whether the second intra prediction mode is obtained from a decoder side intra mode derivation or a template based intra mode derivation is signaled in a bitstream.

5. The method of claim 1, wherein obtaining the second intra prediction mode comprises deriving the second intra prediction mode from one or more reconstructed samples neighboring the at least one block.

6. The method of claim 1, wherein the second intra prediction mode is obtained from at least one of a decoder side intra mode derivation or a template based intra mode derivation.

7. The method of claim 1, wherein the determination that the first intra prediction mode is to be combined with the second intra prediction mode is based on an indicator signaled for the at least one block in a bitstream.

8. The method of claim 1, wherein the determination that the first intra prediction mode is to be combined with the second intra prediction mode for the at least one block is based on a cost obtained when determining the second intra prediction mode.

9. A non-transitory computer readable medium storing executable program instructions to cause a computer executing the program instructions to: for at least one block of an image or a video, decode an indicator indicating a first intra prediction mode, wherein the first intra prediction mode is one of an intra block copy prediction mode or a matrix-based intra prediction mode, determine whether the first intra prediction mode is to be combined with a second intra prediction mode for obtaining a prediction of the at least one block, responsive to determining that the first intra prediction mode is to be combined with a second intra prediction mode, obtain the second intra prediction mode, and decode the at least one block based on a combination of the first intra prediction mode and the second intra prediction mode.

10. An apparatus comprising one or more processors, wherein the one or more processors is operable to, for at least one block of an image or a video:

decode an indicator indicating a first intra prediction mode, wherein the first intra prediction mode is one of an intra block copy prediction mode or a matrix-based intra prediction mode, determine whether the first intra prediction mode is to be combined with a second intra prediction mode for obtaining a prediction of the at least one block, responsive to determining that the first intra prediction mode is to be combined with a second intra prediction mode, obtain the second intra prediction mode, and decode the at least one block based on a combination of the first intra prediction mode and the second intra prediction mode.

11. The apparatus according to claim 10 comprising at least one of (i) an antenna configured to receive a signal, the signal including data representative of the image or the video, (ii) a band limiter configured to limit the signal to a band of frequencies that includes the data representative of the image or video, or (iii) a display configured to display the image or video.

12. The apparatus of claim 10, wherein one of the first intra prediction mode or the second intra prediction mode is obtained from among a set of non-directional intra prediction modes, and the other of the first intra prediction mode and the second intra prediction mode is obtained from among a set of directional intra prediction modes.

13. The apparatus of claim 10, wherein the second intra prediction mode is obtained from at least one of a decoder side intra mode derivation or a template based intra mode derivation.

14. The apparatus of claim 10, wherein determining that the first intra prediction mode is to be combined with the second intra prediction mode is based on an indicator signaled for the at least one block in a bitstream.

15. The apparatus of claim 10, wherein determining that the first intra prediction mode is to be combined with the second intra prediction mode for the at least one block is based on a cost obtained when determining the second intra prediction mode.

16. A method, comprising, for at least one block of an image or a video:

encoding an indicator indicating a first intra prediction mode, wherein the first intra prediction mode is one of an intra block copy prediction mode or a matrix-based intra prediction mode, determining whether the first intra prediction mode is to be combined with a second intra prediction mode for obtaining a prediction of the at least one block, responsive to determining that the first intra prediction mode is to be combined with a second intra prediction mode, obtaining the second intra prediction mode, and encoding the at least one block based on a combination of the first intra prediction mode and the second intra prediction mode.

17. An apparatus comprising one or more processors, wherein the one or more processors is operable to, for at least one block of an image or a video:

encode an indicator indicating a first intra prediction mode, wherein the first intra prediction mode is one of an intra block copy prediction mode or a matrix-based intra prediction mode, determine whether the first intra prediction mode is to be combined with a second intra prediction mode for obtaining a prediction of the at least one block, responsive to determining that the first intra prediction mode is to be combined with a second intra prediction mode, obtain the second intra prediction mode, and encode the at least one block based on a combination of the first intra prediction mode and the second intra prediction mode.

* * * * *